United States Patent
Lehmann et al.

(10) Patent No.: US 8,392,116 B2
(45) Date of Patent: Mar. 5, 2013

(54) NAVIGATION DEVICE AND METHOD FOR PREDICTING THE DESTINATION OF A TRIP

(75) Inventors: Jens Lehmann, Walldorf (DE); David Sommer, Walldorf (DE)

(73) Assignee: SAP AG, Walldorf (DE)

( * ) Notice: Subject to any disclaimer, the term of this patent is extended or adjusted under 35 U.S.C. 154(b) by 478 days.

(21) Appl. No.: 12/730,973

(22) Filed: Mar. 24, 2010

(65) Prior Publication Data

US 2011/0238289 A1 Sep. 29, 2011

(51) Int. Cl.
*G01C 21/00* (2006.01)
(52) U.S. Cl. .......... 701/524; 701/481; 701/533; 706/21; 706/25; 707/748; 707/758; 707/769; 340/991; 340/992; 340/995.23
(58) Field of Classification Search .......... 701/408–430, 701/450, 451, 461, 468, 481; 706/21, 25, 706/52; 707/758, 736, 769, 748; 340/994, 340/995.1–995.25
See application file for complete search history.

(56) References Cited

U.S. PATENT DOCUMENTS

| | | | |
|---|---|---|---|
| 6,484,092 B2 * | 11/2002 | Seibel | 701/465 |
| 6,584,401 B2 * | 6/2003 | Kirshenbaum et al. | 701/521 |
| 6,591,188 B1 * | 7/2003 | Ohler | 701/423 |
| 7,058,506 B2 * | 6/2006 | Kawase et al. | 701/410 |
| 7,233,861 B2 * | 6/2007 | Van Buer et al. | 701/424 |
| 7,620,404 B2 * | 11/2009 | Chesnais et al. | 455/456.1 |
| 7,636,630 B2 * | 12/2009 | Fushiki et al. | 701/423 |
| 7,778,773 B2 * | 8/2010 | Yaqub et al. | 701/412 |
| 8,126,903 B2 * | 2/2012 | Lehmann et al. | 707/758 |
| 2007/0150174 A1 * | 6/2007 | Seymour et al. | 701/200 |
| 2009/0030885 A1 * | 1/2009 | DePasquale et al. | 707/3 |
| 2009/0248587 A1 * | 10/2009 | Van Buskirk | 705/80 |
| 2011/0153629 A1 * | 6/2011 | Lehmann et al. | 707/758 |

* cited by examiner

*Primary Examiner* — Russell Frejd
(74) *Attorney, Agent, or Firm* — Kenyon & Kenyon LLP

(57) ABSTRACT

A navigation device and computer implemented method for predicting the destination of a trip, the method being executed by a navigation device, the method comprising the steps of: determining starting parameters, the starting parameters comprising at least the starting point, starting time and date of the trip, executing a destination prediction algorithm, the destination prediction algorithm taking the starting parameters as input and predicting a destination, wherein the destination prediction algorithm is generated by using information of a trip history; determining, upon arrival at the predicted or another destination, the actual destination.

19 Claims, 7 Drawing Sheets

NAVIGATION DEVICE AND METHOD FOR PREDICTING THE DESTINATION OF A TRIP

FIELD OF THE INVENTION

Example embodiments of the present invention relate to the field of data processing, and more particularly to a navigation device and computer implemented method for predicting the destination of a trip based on a set of starting parameters.

BACKGROUND AND RELATED ART

Various navigation systems are known facilitating the task of finding the fastest and/or shortest route to a destination specified by the driver of a vehicle. The most commonly used form of navigation devices currently are GPS based navigation systems for cars, but a growing number of other mobile devices such as mobile phones, notebooks, smartcards and the like come with the function of dynamically assisting the owner in finding the right route to a preselected destination. Those systems are not limited to the use in cars; they can also assist bicyclers and pedestrians in finding their ways. In particular for long-distance travels in regions the driver is not familiar with, those systems tremendously facilitate the task of deciding which route to choose at each crossing. Navigation devices provide this function usually by a combination of geographical knowledge stored in the form of street-maps in combination with dynamically generated data on the current position of the vehicle, which is mapped to streets of the street-maps. Usually, the dynamic determination of the position is based on GPS data received from a satellite. The navigation system indicates its user, e.g. via a graphic display and/or a voice, which street to chose at every crossing or slip road.

Advanced versions of current navigation system provide the user with the additional convenience of receiving current traffic information, e.g. traffic jam information.

A considerable disadvantage of existing systems is that the entry of the destination is a tedious and time consuming task. Usually, the input means provided by mobile navigation devices for entering destination data, e.g. a postal address, are cumbersome to use. Due to the limited space available on most mobile processing devices, the user cannot make use of a large key board to enter long street and city names but rather has to turn or press a small set of buttons to specify an address. Not only is this approach time consuming, it is also dangerous in case the driver of a car enters the destination while driving. Therefore, most people do not use their navigation devices for routes they are familiar with, e.g. for their daily routes from home to work and back. However, turning off the navigation device for those well-known routes also has some drawbacks. A turned-off navigation device cannot inform the driver on current traffic-announcements. The driver may therefore loose time in traffic jams which could have been avoided if he had not turned off his navigation device.

SUMMARY OF THE INVENTION

Example embodiments of the present invention (hereinafter "the invention" and/or "the present invention") provide a computer implemented method for predicting the destination based on a set of starting parameters.

The present invention improve the benefit provided by current navigation devices to their users in multiple ways: by automatically predicting the destination of a trip given a set of starting parameters, a navigation device according to preferred embodiments of the invention renders the explicit entry of the destination unnecessary, which is particularly advantageous for trips which are repeatedly executed.

In a further aspect, the invention provides a means to discriminate between repeatedly executed trips, such as the daily trip from home to work, and singular or rarely executed trips, such as weekend or holiday trips. This is particularly beneficial, as some features provided by current navigation devices are useful only for singular trips while other feature are always of use for the driver. For example, current traffic announcements will be of value for commuters as well as people being on a long distance travel on an unknown route, while the voice giving advices when to turn left or right at each crossing will be considered as annoying by most commuters. Current navigation assistants are "dull" and are not able to automatically determine if the current trip is executed by a commuter or by a person unfamiliar with the current route. The navigation device according to a preferred embodiment of the invention is capable of automatically detecting if the trip is executed regularly or not and is capable of selectively providing the user only with relevant information. As a result, a driver can turn on the navigation device also on well known routs to receive traffic-announcements or other information being of interest also for users being familiar with a particular route, because he can be sure that no voice will annoy him with unwanted instructions when to turn left or right unless in situations in which such an instruction is usually helpful.

In the following, the term 'navigation device' will refer to any device being capable to locate its own position. The navigation device may be completely mobile, e.g. in the form of a notebook, a smart-phone, a mobile phone, a blackberry, a car, -bicycle-, or pedestrian navigation assistant device, or it may be indirectly mobile in case it is an in-built component of a mobile vehicle, e.g. a car or a bicycle. Said list of devices shall be considered as exemplary. Any kind of device comprising means to determine its current position will be considered as 'navigation device'. The position may be determined in various different coordinate systems, e.g. as geo-coordinates, or as street addresses. The navigation device may use any kind of method to determine its position. The current position of the navigation device may be determined e.g. via communicating with a satellite providing GPS data, via triangulation, via Wi-FI hotspots providing some location information, via resolving location information contained in the IP address assigned by an internet access provider, via mapping of photos taken from the environment currently surrounding a device to a data repository wherein the photo is mapped to a location information, or any other method operable to determine the position of a device.

According to a preferred embodiment, the position and the corresponding position determination unit for determining the current position determine an outdoor position. A person skilled in the art would, with minor adaptations, be able to transfer the concept of the present invention also on navigation and steering devices operating indoor or on the microsystem level, e.g. via the use of various Local Positioning Systems (LPS), The navigation device according to a preferred embodiment of the invention comprises a machine-readable data storage. While the data storage is shown in an exemplary embodiment to be a single medium, the term "data storage" should be taken to include a single data storage or multiple data storages (e.g. one or multiple flash drives, and/or associated caches) that store one or more sets of instructions and/or data blocks. The term "data storage" shall accordingly be taken to include, but not be limited to, solid-state memories, optical and magnetic media, etc.

The data storage comprises a trip history, which is a data structure comprising a multiple trip data objects. Each trip data object is a data object representing a trip that has been executed in the past and that is characterized by a set of starting parameters and a destination.

A data object is a representation of almost any composite information that must be understood by software. Composite information is a set of a number of different properties or attributes. A data object can represent e.g. an external entity, a thing, an occurrence or event, a role, a place or a structure. A trip data object represents a trip from a starting point to a destination as it actually happened. The destination stored in a trip data object is therefore always the actual destination of a trip. The actual destination of a trip is that destination having been chosen and reached by the user of a navigation device. The actual destination is not necessarily identical to the predicted destination as the user may not follow the prediction in every case. To 'store the actual destination' in a trip data object refers to the storing of positional data determined by the navigation device, e.g. via GPS or other means, in the form of a trip data object.

The starting parameters comprise at least the time and date of departure and the actual destination reached at the end of the trip. Both the starting point, the current position along a trip and the place of arrival are determined by the position determination unit. The navigation device according to said embodiment further comprises a clock for determining the current time and date. The starting parameters gathered at the start of the trip or at a particular position along a trip and the destination reached at the end of the trip constitute a trip data object representing the trip. The trip data object is stored after the end of each trip to the trip history of the data storage if not explicitly specified otherwise by the user.

The trip history is a set of trip data objects, wherein each trip data object represents a past trip. The trip history is used by a software component in the following referred to as 'learning module' as data source based on which the navigation device predicts the destination a user will chose given a set of starting parameters. According to a preferred embodiment of the invention, the learning module, as a result of a learning process, returns a destination prediction algorithm. The destination prediction algorithm according to preferred embodiments of the invention is a learning algorithm, e.g. a supervised learning algorithm trained on the trip history, or is based on statistical calculations based on the trip history.

According to a preferred embodiment, the supervised learning algorithm is based on neural networks, e.g. "feed-forward back-propagation neural networks". According to a further embodiment of the invention, genetic algorithms or other machine-learning approaches such as SVMs, Bayesian statistics, decision trees or other learning algorithms are applied to predict the destination a user will probably chose given a set of starting parameters, in particular the starting time and location. The learning module, by training or re-training an existing machine learning algorithm on the trip history, generates a destination prediction algorithm whose prediction accuracy grows over time provided the user of the navigation device does not show a random or completely unsteady traveling behavior.

The determination of the accuracy of the destination prediction algorithm depends on the machine learning approach applied. According to embodiments of the invention whose destination prediction algorithm is based on neural networks, the accuracy of the destination prediction algorithm is determined as the size of a mean-square error signal retrieved by comparing a predicted destination with the actual destination of a trip. The accuracy value of the prediction algorithm in combination with a probability value for a predicted destination is used by embodiments of the present invention to determine a prediction score. Said prediction score is used to automatically select an operation mode of the navigation device. Provided, the accuracy of the destination prediction algorithm is high enough, external services may automatically be requested by the navigation device. For example, a notification on the current trip may be submitted automatically to a trip sharing service to notify potential trip accompanies.

According to further embodiments of the invention, the learning module does not employ a machine learning approach in the strict sense of the word. Rather, the destination prediction algorithm comprises a first step of weighting each starting parameter type of the trip data objects, a second step of calculating, for each starting parameter type having a particular value or value range the percentage values indicating how often the driver chose a particular destination given that value or value range for the starting parameter type, a third step of weighting the calculated percentage value with a starting parameter type specific weight and finally summing up the weighted percentage values for all starting parameter types currently available to a total probability score for each destination 'known' to the navigation device.

According to said embodiment, the learning module provides a prediction algorithm which predicts, based on statistical information contained in the trip history in combination with starting parameter type weights, the probability that the user chooses a particular destination given the current starting parameters. Depending on the embodiment of the invention, the starting parameter type weights may be predetermined by the learning module, be determined by the user or be adapted by an additional learning routine implemented in the learning module.

The percentage values for choosing a particular destination given a set of starting conditions may change over time. The destination prediction algorithm based on statistical information of the trip history can therefore, like the machine learning based approaches, be considered as methods being capable to learn the destination having the highest probability of being chosen by the owner of the navigation device given a set of starting parameters from the information contained in the trip history.

According to an embodiment of the invention, the list of 'known destinations' is determined by analyzing all destinations, e.g. postal addresses, explicitly entered as destinations in the navigation device by the user. According to further embodiments of the invention, the list of 'known destinations' further comprises 'application derived destinations. Application derived destinations are addresses having been derived from a contact list of a calendar application or address book application being installed on a navigation device or on any mobile device that can be connected to the navigation device. According to said embodiments, it is not required that the user or his navigation device have actually been at each of said addresses of the address book application or the calendar application in order to integrate those addresses in the list of 'known destinations'.

According to a further embodiment of the invention, the list of known destinations comprises the explicitly entered destinations and destination the user of the navigation device chose without entering this data explicitly into the navigation system.

According to a further embodiment of the invention, the list of known destinations comprises the explicitly entered destinations, destinations the user of the navigation device chose without entering this data explicitly into the navigation system, application derived addresses and implicit destinations.

Implicit destinations are destinations the user does not explicitly enter or even considered to be a destination. Implicit destinations are locations along routes the navigation device has determined automatically during a trip along a road. The implicit destinations are determined automatically after having traveled a predetermined amount of way or time, e.g. every second mile or every five minutes. The navigation device may determine its position more frequently than implicit destinations are determined. Implicit destinations enable embodiments of the invention not only to learn the final destination based on the trip history of a user, but also the routes the user prefers. While it may be necessary to determine the current position of the navigation device very frequently to provide the user with appropriate navigation instructions, the determination of implicit destinations can be executed less frequently as the main function of determining implicit destination points is to allow the navigation device to learn different routes from the user's driving behavior. According to embodiments of the invention wherein implicit destinations are determined, a trip from the starting where the user starts the trip to the final destination comprises a list of sub-trips. The implicit destination of the previous sub-trip thereby acts as starting point for the next sub-trip. At each starting point of a sub-trip, the starting parameters are gathered again and the prediction algorithm is executed.

According to preferred embodiments of the invention, for each implicit destination is calculated by the destination prediction algorithm a probability value being indicative of the probability that a user of the navigation device will chose said destination given a set of starting parameters. In case the probability that the user will chose a particular first implicit destination is above a predefined or user-defined threshold variable, the destination prediction algorithm predicts second implicit destinations starting from the first predicted implicit destination. Said process is repeated until the probability value of choosing a particular implicit destination has fallen below a particular threshold variable or the final destination, e.g. an address having been explicitly entered by the user or having been derived from a calendar application of the navigation device, is reached. Thereby, the destination prediction algorithm tries to determine the longest continuous sequence of implicit destinations having a total probability of being chosen by the user lying above a particular threshold variable.

For example, if a driver, given a set of starting parameters, is predicted to choose implicit destination A with a 97% probability and implicit destination B with 3% probability, no further implicit destination will be calculated starting from the implicit destination B in case the threshold variable for this calculation is 90%. But second implicit destinations will be calculated starting from A.

In case the destination prediction algorithm predicts a probability of 91% of driving to C, a 5% probability of driving to D and a 4% probability of driving to E starting from implicit destination A, the intermediate destination predicted by the destination prediction algorithm is "C" and the total probability to chose C is 90%×91%=0.82. In case the user of the example chooses, starting from "C", 5 intermediate destinations F, G, H, I J and K with a probability of 20% each, then the probability to drive to each of said 5 intermediate destinations is 82%×20%=16.4%. Said probability value can generally be considered as too low to rely on and to represent a reliable prediction.

In the given example, the implicit destinations "A" and "C" are therefore considered as the longest continuous sequence of predicted implicit destinations and "C" the farthest possible predictable destination. It may well be the case that the prediction result becomes more accurate if the driver really reaches "C", because all predicted probability values given beforehand were calculated at start. It may well be possible that during the trip, various parameters change making a prediction, which of the implicit destinations F-K the driver will actually choose, more accurate. The farthest possible predicted destination is that implicit or explicit or application derived destination which lies farthest apart from the current location of the navigation device but whose total probability of being chosen by the driver is still over a user-defined or predefined threshold variable.

The destination prediction algorithm generated or provided by the learning module is used by a destination prediction module to predict the most probable destination given a set of starting parameters. The algorithms and routines employed by the learning module and the destination prediction algorithm are preferentially implemented as software modules although some or all program routines may also be implemented as firm-ware or hardware. The terms 'learning module' and 'destination prediction' module refer to functional modules, which can, but do not necessarily have to be implemented in the form of two different hardware or software modules. A functional separation of the learning aspect and the prediction aspect provides the user with the option to disable either the learning function or the prediction function or both of them. The provision of the feature of selectively enabling or disabling those functions may be computationally realized by enabling or disabling two independent software or hardware modules. Alternatively, it may be provided by a monolithic block of software making use of both modules at the same time. According to a preferred embodiment of the invention, the default operation mode of the navigation device is to predict the destination after every start of the vehicle and to learn by adding new trip data objects to the trip history after each trip and to retrain the learning algorithm on a regular basis, e.g. upon every entry of a new trip data object to the trip history. To execute the read/write operation on the data storage comprising the trip history and to execute the learning and destination prediction tasks, the navigation device further comprises a processor, e.g. a single- or multi-core processor.

The predicted destination is indicated to the user. According to embodiments of the invention, the destination is indicated and presented graphically, e.g. by displaying on a screen a street-map comprising the current position of the vehicle and a highlighted route leading the user to the destination. Additionally or alternatively to the graphic display of the route, the destination may be indicated to the user acoustically via a voice giving instructions when to turn to one's left or right.

According to a preferred embodiment of the invention, the prediction score is never considered as high enough, irrespective of the calculated destination probability value, if the number of trip data objects in the trip history is below a threshold variable for the minimum trip history size. Said threshold variable may be predefined or be set by a user of the navigation device. The trip history size is the number of trip data objects in the trip history. In case the user executed only three trips with the navigation device yet, all having been made from the same starting position at the same time and all leading to the same destination, the prediction algorithm may predict a very high probability that the user will chose said destination again, as 100% of all trips given the particular set of starting parameters resulted in the same destination. As the data basis of three trips is nonetheless too small to really rely on the resulting prediction, the assignment of only a small accuracy value to predictions made on a tiny data basis protects the user from unwillingly requesting services or information inappropriate for his actual destination.

According to an embodiment of the invention, the destination prediction algorithm is retrained every time a new trip data object is stored to the trip history. According to further embodiments, in particular in those embodiments wherein the training algorithm is highly demanding in respect to computational power, the retraining may be executed on a less frequent basis, e.g. once in a week or upon the storage of every fifth new trip data object.

Typically, the time and place of departure is a strong indicator of the destination of the trip. Many people commute to work every working day. They usually start every working day from the same place (home) and roughly at the same time, e.g. between 7.15 a.m. and 7.30 a.m. A destination prediction algorithm taking into account only those two factors starting time and starting place will therefore reach good accuracy for those repeatedly executed trips from home to work and back or from home to a regularly visited leisure facility. The accuracy of the destination prediction algorithm can be further refined by taking into consideration in addition the date and date related information. For example, the destination chosen by a driver may strongly depend on the question, if the current day is a working day, Saturday or Sunday or Holiday. If the user of the navigation device visits the leisure facility, e.g. a tennis club, on every Wednesday evening, the information on the current week day is an important predictor of the destination.

Starting time and date and the place of departure are therefore important indicators and predictors of the destination, but they are not the only ones possible. The prediction method according to preferred embodiments of the invention comprises receiving various types of additional starting parameters via various interfaces, which can be used to further increase the accuracy of the prediction method.

According to a further embodiment of the invention, the starting parameters comprise in addition external data of one or multiple external data providers. Depending on the embodiment of the invention, the external data can be current weather data, traffic-announcements, traffic-jam information, information on current diversion routes, data on the existence, opening hours, pricing information and service offers of various points of interest (POIs) lying in spacial proximity to the current position of the vehicle. Such POIs can be, for example and without limitation: hotels, hostels, shops, gas stations, car repair shops, leisure facilities of various types. Embodiments of the invention wherein the navigation device receives external data from said one or more external data providers use the external data retrieved at each starting point of a trip as additional starting parameters. All starting parameters are used as input for the destination prediction algorithm. After reaching the predicted or another destination chosen by the user, all starting parameters of the trip, including the external data retrieved at start, are stored in association with the destination to the trip history.

For example, a driver according to one embodiment of the invention may have to choose between two equally long (regarding time and distance) routes to drive from home to work. He may have no particular preference for one of the routes and uses each route with a probability of about 50%. Next to each of both routes there exists a gas station. According to one embodiment of the invention, the navigation device receives at start pricing information from both gas stations and indicates this information to the user, e.g. via a display of the navigation device in case the car has detected a low fuel level. The prices of both gas stations vary on a daily basis and are forwarded to a central gas station pricing information service which lists the gas prices of all gas stations of a country and updates them on a daily basis. Said service provides this information via a SOAP based web service interface to various remote client application programs. The navigation device according to said embodiment comprises an interface being operable to request current pricing information of local gas stations via an interface. The term 'interface' as used herein subsumes all components, hardware—as well as software based, necessary to establish a physical and logical connection with an external data provider and to exchange data with said provider. Data exchange requires on the physical level the submission of data, e.g. a service request, via a network. The network connection can be established e.g. via a mobile internet connection based on UMTS, W-LAN, Bluetooth or any other communication standard and technology connecting two or more processing systems with each other. On the logical side, the interface has to guarantee that the request to a service is submitted in a format interpretable by the service and has to guarantee the receipt and correct interpretation of the results returned by the called service. A mobile network card may provide access to the internet on a physical level while the installation of appropriate client programs on the navigation device contribute additional functionality necessary to interpret the information requested from and returned by the remote service.

The user of the described example will chose to use that one of the two routes along which the gas price of the respective gas station is lowest. As other parameters, e.g. weather data, is considered as not relevant by the user of the example, the learning module will have learned, after having processed a multitude of trip data objects, that the pricing information of the gas stations is an important indicator to predict which of both routes the user will chose to drive to work in case the fuel level of the car is low.

According to further embodiments, external data provided by external data suppliers is not used as a starting parameter assisting in the prediction of the destination, but is rather received after and as a result of the prediction of a particular destination. For example, a big company having subsidiaries in multiple towns could offer an ad-sponsored version of the navigation device. The navigation device would, after having predicted a destination with sufficient prediction score, submit a request via an interface to a remote interface of a server run by said company, the request being indicative of the predicted trip destination or interim destinations along a route. As a response, the server could return advertisement which is specific to the predicted destination, which is then displayed or otherwise indicated to the user. The advertisement could comprise special offers of a particular branch of the company residing in the destination town. This kind of advertisement may be indirectly beneficial to the user as it paves the way for ad-sponsored navigation devices, but it may also be directly beneficial by the user, because it allows the user to subscribe to services and news being particular for the location the user has chosen as his destination and to automatically receive appropriate information whenever being on a trip to that destination.

According to a further embodiment of the invention, the interface used to receive external data is operable to receive data from a trip sharing service and to automatically or semi-automatically send predicted destinations to the trip sharing service. In case a user drives to a tennis club every Wednesday evening at 6. p.m. and, after having played tennis for three hours, always drives home at 9. p.m., the navigation device according to said embodiment of the invention could submit a planned trip from work to the tennis club at 5.45 p.m. and from there to home at 9 p.m. every Wednesday evening and offer other registered users of the trip sharing service the option to join the trip.

This embodiment is particularly advantageous for several reasons: a common problem of many trip sharing services is that only a fraction of the people owning and driving a car is willing to participate in a trip sharing service. Even if they are registered at the service, neither the driver nor the passenger usually use the service for short trips or for commuting to work, although those short and regularly executed trips make up a high fraction of the private traffic. The capacities theoretically available are therefore not used and many cars move on the streets comprising only one person, the driver. The main reason for the inefficient capacity utilization of current trip sharing services is the fact that the manual entry of planned trips is too tedious to appear as worth the effort in particular for short trips.

Further, the communication required to establish an agreement between driver and passengers to share a trip is to complex, inflexible and time consuming to pay off for short distance trips. Further, most people do not start to drive to work every day at exactly the same minute; they may start at 7.15 a.m. one day and 7.25 a.m. at another day. Usually, the driver knows his real starting time not before he actually sits in his car and starts it. In case the driver uses a navigation device according to an embodiment of the present invention, the navigation device comprising an interface for exchanging data with a remote trip sharing service, the destination predicted automatically by the navigation device will be automatically or upon confirmation by the user sent to a trip sharing service. As a result, the trip sharing service is notified that a trip is planned to start right at the moment from the current position of the driver to the predicted destination. The trip sharing service indicates to matching users of the trip sharing service that there exists the possibility to join the driver as trip accompany. In case a matching user, i.e. a user roughly sharing at least the same destination and place of departure or having a place of departure and destination along the route of the driver, the driver is notified upon the existence of the trip accompany. As the prediction of the destination, the submission of a new trip to the trip sharing service via the trip sharing service interface of the navigation device all can be executed automatically or semi-automatically, the user does not have to invest additional time in specifying the request. Rather, he may simply start his car to drive to work as he does every day. The navigation device will send a notification on the planned trip to the trip sharing service. In case a trip accompany was detected by the service, the pick-up place and the data of the trip accompany are displayed to the driver. In case the driver has specified in his profile to automatically accept suggested trip-accompanies, the driver may now pick up the passenger, or he may contact the potential passengers in case he has specified not to automatically accept requests from matching trip accompanies.

According to a further embodiment of the invention, the driver has not specified to automatically accept and pick-up a potential trip-accompany automatically but rather decides spontaneously in each situation. According to said embodiment of the invention, the detour required for a particular potential trip accompany as well as other trip accompany parameters such as age, gender or smoking habits of each accepted and picked-up trip accompany are used as additional starting parameters of the destination prediction algorithm. As a result, the prediction algorithm learns, if the driver will probably accept a detour for a potential trip accompany given the detour length and further trip accompany parameters.

The list of possible applications for a navigation device according to embodiments of the present invention is long. Whenever the integration of an external service requiring information on the planned destination of a trip is beneficial for the owner of the navigation device and wherein the benefit provided by the service may be too small to motivate the user to explicitly enter his destination and exact starting time for every short and regularly executed trip, the use of a navigation device can solve the problem.

A further example of the usefulness of the present invention is the fact that a navigation device according to an embodiment of the present invention is operable to work in different working modes, wherein the working mode depends on the prediction score (PS) of a prediction. The prediction score is a derivative of both the accuracy of a destination prediction algorithm and the probability value calculated for a particular destination. While the accuracy score indicates the prediction quality of a calculation, the probability value indicates the predicted destination. In order to completely rely on a predicted destination, both the accuracy of the prediction method and the predicted probability for a user to chose a particular destinations have to be high. According to embodiments of the invention, the prediction score is calculated based on a multiplication of the accuracy of the algorithm and the probability value for a particular destination. According to further embodiments of the invention, the prediction score is derived via any other function applied on both values, e.g. a function wherein the prediction score is equal to the predicted probability value for a particular destination provided that the accuracy of the algorithm reaches a predefined or user-defined threshold variable.

According to preferred embodiments of the invention, at least three operation modes of the navigation device are supported: an 'instructed driving mode', a 'commuter mode and a 'silent mode' and at least a first and a second threshold variable for the prediction score are specified by a user or manufacturer of the navigation device.

The 'commuter mode' is a mode of operation wherein the navigation device has predicted at least one destination with high prediction score (high probability value for a particular destination given a high or at least a sufficient prediction algorithm accuracy) and wherein said prediction score lies above a first threshold variable. According to some embodiments of the invention, said first prediction score threshold variable is in the range of 70-100%. The 'commuter mode' is a mode of operation of the navigation device according to which all those functions of the navigation device are enabled which provide a beneficial effect for a user who is familiar with a particular route. Functions of the device which may be considered as disturbing drivers being familiar with the route to the predicted destination having the highest prediction score are disabled. For example, a commuter is usually interested in receiving traffic announcements on the planned route but does not want to listen to a voice giving detailed instructions which route to take to reach his destination. Only in case of an actual traffic-jam warning on the planned route or similar extraordinary events, the user may appreciate to receive driving instructions allowing him to avoid the jam and to reach his destination without delay.

According to preferred embodiments of the invention, driving instructions per voice are disabled in commuter mode except in extraordinary situations wherein such instructions may be helpful, e.g. in case traffic jam announcement is received by the navigation device. In this case, driving instructions how to avoid the jam may be indicated via voice and/or graphically to the user although the user is familiar with a particular route.

In case the calculated prediction score for all predicted destinations is lower than the first threshold variable, but at least one predicted destination has a prediction score being higher than a second prediction score threshold variable, the navigation device is operated in an 'instructed driving mode'. In this mode, functions which require a high reliability of the predictions are disabled or at least not executed automatically. The user of the navigation device is presented a list of one or more predicted destinations reaching the highest prediction score above said second threshold variable. Upon selection of a predicted destination or upon the explicit entry of another destination, the navigation device instructs the user how to reach the destination. Said instructions comprise instructions via voice and may also comprise instructions via a display. Services which may be called automatically in 'commuter mode', e.g. the submission of a predicted trip to a trip sharing service, are not or only upon confirmation executed in instructed driving mode. Predicted destinations are not automatically submitted to the trip sharing service as an inaccurate prediction could cause considerable trouble to a trip accompany having been erroneously been notified of a shared trip opportunity that actually does not exist.

On the other hand, functions of the navigation device which are disabled in the commuter mode may be enabled in the 'instructed driving mode', e.g. the provision of explicit, voice based instructions which direction to take and when to turn to one's left or right in order to reach the destination.

A typical use case for driving in 'instructed driving mode' would be the situation according to which a sales representative executes a trip to a several 100 miles remote customer he has already visited twice. The number of visits is not high enough for the destination prediction algorithm to predict with high accuracy and high predictions score the destination, but the destination prediction algorithm calculates, after the sales representative has driven onto a particular motorway he has not been on for any other customers, that the sales representative will probably drive to said customer and suggest the predicted destination to the driver. The driver does only have to accept the suggested destination without having to enter it explicitly and will be instructed by the navigation device, e.g. via a voice, to the office of the customer. In case he visits said customer repeatedly in the future, the accuracy of the prediction algorithm will improve and the navigation device in the future may predict the correct destination with a high prediction score, turn to 'commuter mode' and will not present the sales representative route details he is sufficiently familiar with.

Another example would be a deviation by the driver from the common route. In this case, the prediction accuracy of the destination prediction algorithm decreases significantly as the current position determined dynamically by the navigation device may be unknown. As a result, the navigation device automatically switches from commuter mode to instructed driving mode.

According to some embodiments of the invention, a second prediction score threshold variable is in the range between 0 and 50%. In case the prediction score of all predicted destinations is below said second threshold, the navigation device switches to 'silent mode' and does not provide the driver with instructions on where to drive to or present him predicted destinations.

In 'silent mode', the navigation device remains silent until, at some point along the route actually chosen by the driver, at least one destination can be predicted with a prediction score higher than the first or the second prediction score threshold variable. In this case, the navigation device will switch to another operation mode.

For example, after having trained the destination prediction algorithm for several weeks, the algorithm will return high accuracies at least for the trips executed every day or every working day, e.g. from home to work. In case the owner of the navigation device spends every weekend at a particular town, the trips to this town every Friday evening will also be predicted with high accuracy. In case the same user visits a broad variety of leisure facilities during his weekends, thereby visiting many different places at an irregular pattern of time, the prediction algorithm will be able to predict with high accuracy that he will drive from town A to town B in case it is Friday evening 5 p.m. The destination prediction algorithm will not be able to predict with high accuracy, where the user wants to go to at a particular time on Saturdays or Sundays, as the driving behaviour revealed by the trip history does not allow a reliable prediction of the trip destinations during the weekends of the user. The navigation device will therefore, provided the trip sharing specifications of the user allow this, automatically submit the destination to the trip sharing service for the user's trips from home to work and back and on his trips on Friday evening from town A to town B. The navigation device will not do this for the weekend forays of the user, because the accuracy of the destination predictions for those days is not high enough. In the user example given beforehand, it can indeed be assumed that the user appreciates being instructed where to drive in his spare time activities in his weekend, because he prefers to visit each time another leisure facility. In case the user would start visiting the same facility every Saturday afternoon, the navigation device would soon be operable to reliably predict this destination, thereby switching from the 'instructed driving mode' to 'commuter mode'.

By using a predefined or user-defined accuracy threshold variable for the destination prediction algorithm, the navigation device is operable to automatically switch between different operation modes and to automatically detect the appropriate mode at the start or during the execution of the trip.

According to further beneficial aspects of embodiments of the invention, the algorithm is operable to automatically adapt to a changed driving behaviour. For example, if the user changes his working place, the algorithm will at first predict erroneous destinations, as the algorithms does not know that the working place has changed. After having chosen several times a different than the predicted destination, the accuracy of the prediction method will fall. The accuracy of the prediction will raise with the growing number of trips executed to travel from home to the new working place and finally exceed the threshold variable for the 'commuter mode' again. According to further embodiments of the invention, the user is provided with means to accelerate the learning process, e.g. by actively overwriting or deleting the trip history or by turning off the learning functionality. If the user, for example, substitutes an ill colleague for one week, therefore temporarily changing his place of work, he may not want the navigation device to learn a driving pattern he will probably never follow again in the future. This can be achieved by selectively and temporarily turning off the learning function of the navigation device.

According to further embodiments of the invention, the accuracy of the destination prediction can further be refined by receiving, via one or multiple additional interfaces, error or status messages provided by the vehicle. According to further embodiments, the vehicle comprises the function of automatically determining which seats are occupied by a person and which are unoccupied. The number and position of the occupied seats can also a very helpful predictor for a destination chosen by the driver.

For example, a person commuting to work alone may always drive directly from home to his office. His son is usually picked up and brought to school by the father of a neighbour's son. From time to time, the neighbour is not able to bring the boys to school, and in those cases the user of the navigation device picks up the two boys and brings them to school instead. A car being operable to detect the number or in addition the position of the occupied seats may for those scenarios be a very good predictor if the destination of the driver will be the office or if the driver will at first drive to the school of his son to drop-off the boys.

According to further embodiments of the invention, the filling level of the gas tank, the vehicles' oil level, or any other error or status information available may be received via one or multiple additional interfaces of the navigation device and indicated to the user. The received vehicle's data is stored as a set of additional starting parameters in association with the actual destination as a trip data object to the trip history after having reached the destination.

According to further embodiments of the invention, the accuracy of the destination prediction can further be refined by receiving, via one or multiple additional interfaces, application data provided by one or multiple applications running on the navigation device. According to one embodiment, the application running on the navigation device is a calendar application comprising events characterized by a particular time, date and location. The information comprised in the electronic calendar of said calendar application is accessible via an interface accessible by the learning module. Upon start, the learning module retrieves event related data, e.g. the starting time, the date and the location of events in the electronic calendar and uses this data as additional starting parameters to predict the destination of the current trip. After having arrived at the predicted or another location chosen by the user, the received application data is stored as a set of additional starting parameters in association with the actual destination in the form of a trip data object to the trip history.

According to a further embodiment of the invention, the destination prediction algorithm is implemented as neural network wherein each starting parameter is used as input in the input layer of the neural network, wherein a set of known destinations determines the set of possible distinct classification results of the neural network. The neural network is trained on the trip history and is, as a result, operable to predict the most probable destination given a particular set of input starting parameters and an accuracy value indicating the accuracy of the destination prediction. Each starting parameter comprises a weight depending on its type. The weighted starting parameters of all trip data objects of the trip history are used as input for training the neural network. As a result of training, the neural network predicts the destination of a trip by selecting one particular destination from a set of known destinations. The set of known destination may, depending n the embodiment of the invention, comprise all destinations stored in the trip history, or comprise only those destinations explicitly entered into the navigation system by the user. According to a preferred embodiment of the invention, the neural network is implemented as "feed-forward back-propagation network", wherein the weights of the starting parameters are adapted in each layer of the network by a back-propagation algorithm to minimize a mean squared error value. The mean squared error value is an indicator of the prediction accuracy of an algorithm implemented as neural network. To 'train' a back-propagation neural network implies to propagate backwards through the network an error value indicating the difference between the observed value (the actual destination chosen by the user) and a predicted value (the predicted destination given a set of starting parameters). Upon back-propagation of the error, changes are made to the weights of the starting parameters in each layer, wherein the weight changes are calculated to reduce the error signal for the destination prediction. The mean square error value of a network is indicative of the prediction accuracy of a neuronal network and is reduced upon each new entry of a trip data object provided that the traveling behavior revealed in those trip data objects follows at least in parts a regular pattern and is not completely random. In case the traveling behavior starts to deviate from a previously established behavioral pattern, e.g. by a change of the working place, the mean square error signal may temporarily increase by adding new trip data objects for the new trips from home to work. In case the destination prediction accuracy represented by the mean square error signal of the neural network reaches a certain threshold, the prediction accuracy is considered as high enough to allow switching into 'commuter mode'.

BRIEF DESCRIPTION OF THE DRAWINGS

In the following, embodiments of the invention are described by way of example, only making reference to the drawings in which.

DETAILED DESCRIPTION

Figure 1:
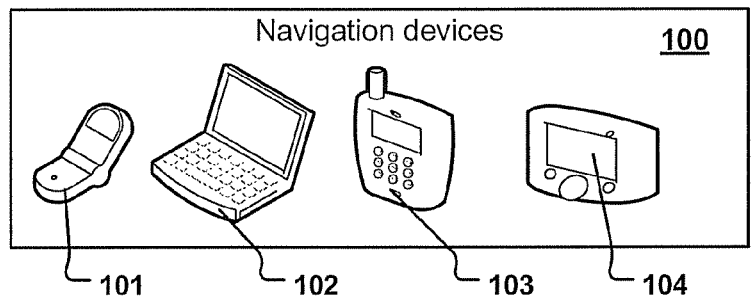
FIG. 1 illustrates a set of devices which can be used as navigation devices.

FIG. 1 illustrates a set of devices which can be used as navigation devices, e.g. smart phones 101, notebooks or netbooks 102, mobile phones 103 or navigation devices, e.g. GPS based navigation assistance devices 104.

Figure 2:
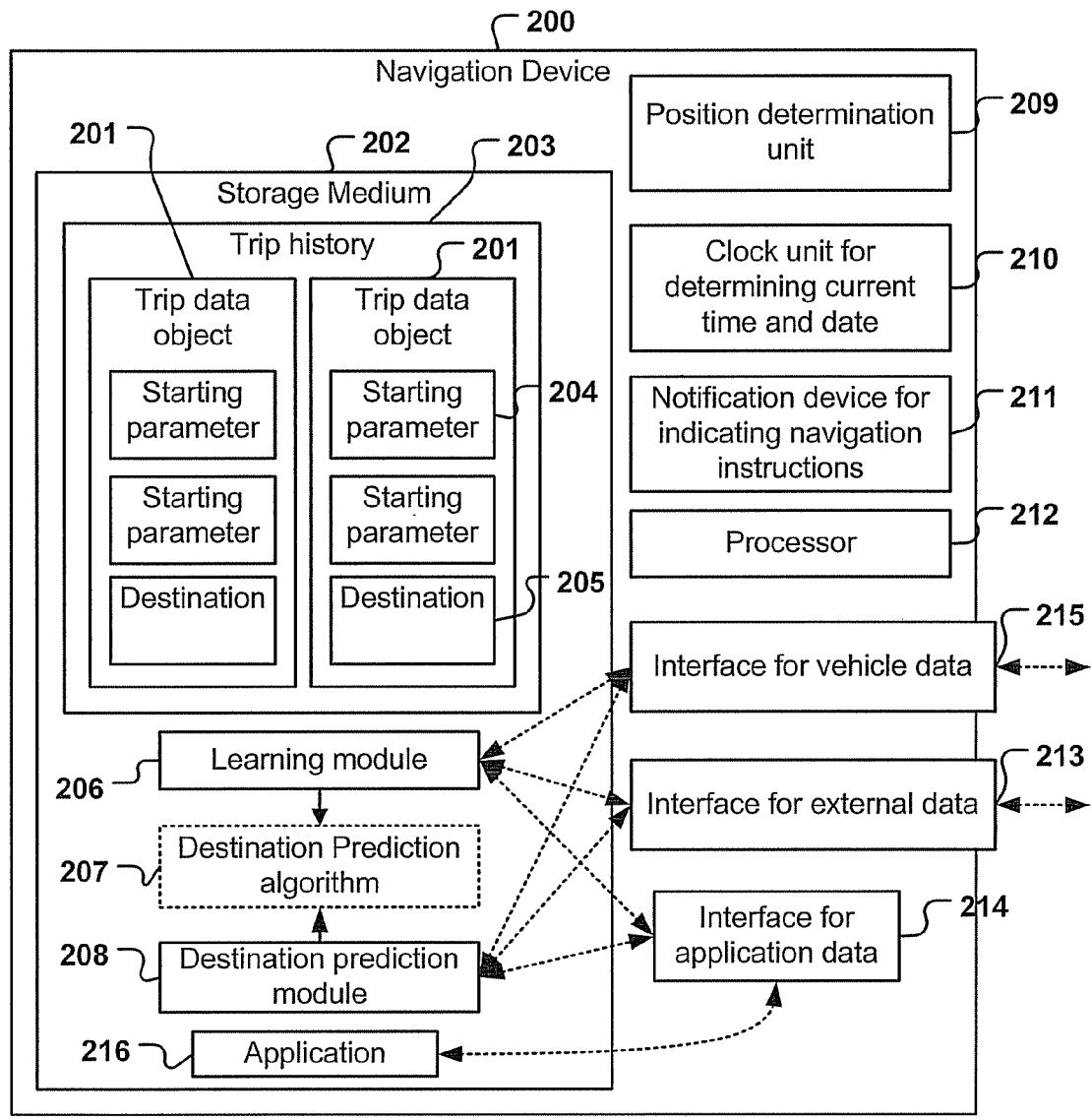
FIG. 2 is a block diagram of the navigation device.

FIG. 2 is a block diagram of a navigation device 200 comprising a non-transitory, computer readable storage medium 202, a position determination device 209 for determining the current position of the device, e.g. a GPS antenna. According to other embodiments of the invention, the navigation device comprises an interface to another device, e.g. a component of the vehicle the navigation device is attached to or wherein the navigation device is built in, for receiving the positional data via said interface. In this case the position determination device for determining the position of the navigation device is an interface to an external device or device component being operable to determine its own position. This position is approximation the same as for the navigation device as long as both are coupled to each other. The navigation device 200 further comprises a clock 210 for determining current time and date, e.g. a clock. The navigation device further comprises a data storage medium 202 to which the trip history 203 is stored. The data storage can be, for example, solid-state memories, optical and magnetic media, etc.

The term "computer-readable non-transitory storage medium" shall also be taken to include any medium that is capable of storing or encoding a set of instructions for execution by the processor 212 that cause the navigation device 200 to perform any one or more of the methodologies of the present invention, or that is capable of storing or encoding data structures utilized by or associated with such a set of instructions. The term "computer-readable non-transitory storage medium" shall accordingly be taken to include, but not be limited to, solid-state memories, optical and magnetic media, etc. such as, but not limited to, any type of disk including floppy disks, optical disks, CD-ROMs, and magnetic-optical disks, read-only memories (ROMs), random access memories (RAMs), magnetic or optical cards, or any type of media suitable for storing electronic instructions.

The trip history is a data structure, e.g. a data object of an object-oriented programming language or a table in a relational data base or any other data application structure operable to store a set of trip data objects 201 representing past trips. Each trip data object comprises at least a destination information 205 and a set of starting parameters 204, wherein the set of starting parameters comprises at least the actual destination of a trip, its starting location and its starting time and date. The navigation device according to said embodiment further comprises a processor 212 for executing the read/write operations on the storage medium 202 or executing computer-readable instructions of the learning module 206 or the destination prediction module 208. The trip history and the computer-readable instruction of both modules 208, 206 do not necessarily have to be stored to one single storage medium 202 but may likewise be stored to multiple separate storage media comprised by the navigation device. The notification device 211 for indicating navigation instructions to the user, a further component of the navigation device, may comprise components for visually and/or acoustically indicating the correct route to the destination. For example, 211 could be a display, e.g. a screen or a touch screen displaying a street map wherein the current position of the navigation device is indicated. The component 211 can also comprise loudspeakers for directing the driver via an emitted voice.

According to further embodiments of the invention, the navigation device in addition comprises one or multiple interfaces 213, 214, 215 for receiving data from other data sources or devices. According to further embodiments of the invention, some or all of those interfaces are in addition operable to submit the predicted destination to external services or additional applications run on the navigation device. Embodiments of the invention comprising an interface 213 for exchanging external data receive via said interface various forms of external data provided by external service providers, e.g. current weather data from weather information services, traffic announcements, pricing information from nearby shops, requests for being picked-up as passenger from a trip sharing service, and similar. The data gathered via said interface is received by the learning module 206 and used as set of additional starting parameters by the learning module 206 for predicting the destination of the current trip.

According to further embodiments of the invention, the interface 213 may in addition be used to submit data from the navigation device to the service after the destination has been predicted by the destination prediction algorithm 207. According to one embodiment, the predicted destination, provided it reaches a minimum required accuracy threshold, is submitted by the destination prediction module 208 via interface 213 to a trip sharing service to notify other registered users of the possibility to take part in the trip starting right at the moment.

According to further embodiments of the invention, the navigation device 200 further comprises an interface 214 for receiving or exchanging data with other application programs running on the navigation device. According to one embodiment, the other application program 216 running on the navigation device is a calendar program comprising event data. An event in the electronic calendar of said calendar program is a data structure representing an event the user of the navigation device takes part at, e.g. a meeting or an appointment. Each event in the calendar comprises data on the location and starting time. The data contained in those events is, according to said embodiment, received by the learning module 206 via interface 214 from application 216.

According to further embodiments of the invention, the application is not a calendar application but rather a CRM system and the application data used to predict the destination are, for example, data on goods to be sold or bought. According to further embodiments of the invention, the application is a project management software and the application data used to predict the destination are, for example, project specific data, e.g. the addresses of contractors or project teams.

According to a further embodiment of the invention, the destination predicted in the destination prediction module 208 is sent to one or multiple other applications 208 running on the navigation device. In said example, the destination predicted by the prediction algorithm 207 is forwarded from the destination prediction module 208 via interface 214 to calendar application 216 where a new event is created automatically in the electronic calendar, comprising at least the current starting position, the current starting time and the predicted destination.

According to further embodiments of the invention, the navigation device 200 further comprises an interface 215 for receiving or exchanging data with a vehicle the navigation device 200 is attached to or built in. According to one embodiment, the learning module 206 receives vehicle data, e.g. status or error messages from various components of the vehicle, via interface 215. The vehicle data is used by the learning module 206 as set of additional starting parameters for the current trip. The learning module uses the vehicle data as input for the destination prediction algorithm to predict the destination of the current trip. For example, the number and position of occupied seats in the car or the amount of gas in the gas tank may be important indicators of the destination the driver may chose and significantly improve the accuracy of the prediction algorithm.

According to a further embodiment of the invention, the predicted destination is further used to control the function of some components of a vehicle. The predicted destination is submitted via interface 215 to the radio of the vehicle and the preferred setting of a component of the vehicle, e.g. the radio station preferred by the user for particular kinds of routes is selected automatically. For example, a business man may listen to news when driving to work to be up to date with current political or social events, but may always chose a music station when driving back home in the evening. The predicted destination is, according to said embodiment, used as reliable indicator of various vehicle parameters, e.g. a radio station. According to said embodiment of the invention, the radio station is selected automatically in a way corresponding to the preferences of the user of the vehicle.

According to further embodiments of the invention, external data, application data or vehicle data, for example, the seat occupation, is used in addition to the predicted destination as input parameter to automatically control a function of the vehicle, e.g. automatically choose a particular radio station. For example, if a particular seat which is usually occupied by the driver's child when it is carried to kindergarten, is occupied and the navigation device predicts the usual daily route to work including a short stop to drop-off the child at kindergarten, a children's radio channel is chosen automatically for the first part of the trip from home to kindergarten and a news channel is automatically turned on for the remaining part of the trip from kindergarten to work.

As a result of the learning process executed by the learning module 206 on the trip history 203 data, a prediction algorithm 207 is generated or refined and provided to the destination prediction module. The destination prediction module is operable to predict the destination of a trip given a set of current starting parameters by using the starting parameters available for the current trip as input of the destination prediction algorithm provided by the learning module.

Figure 3:
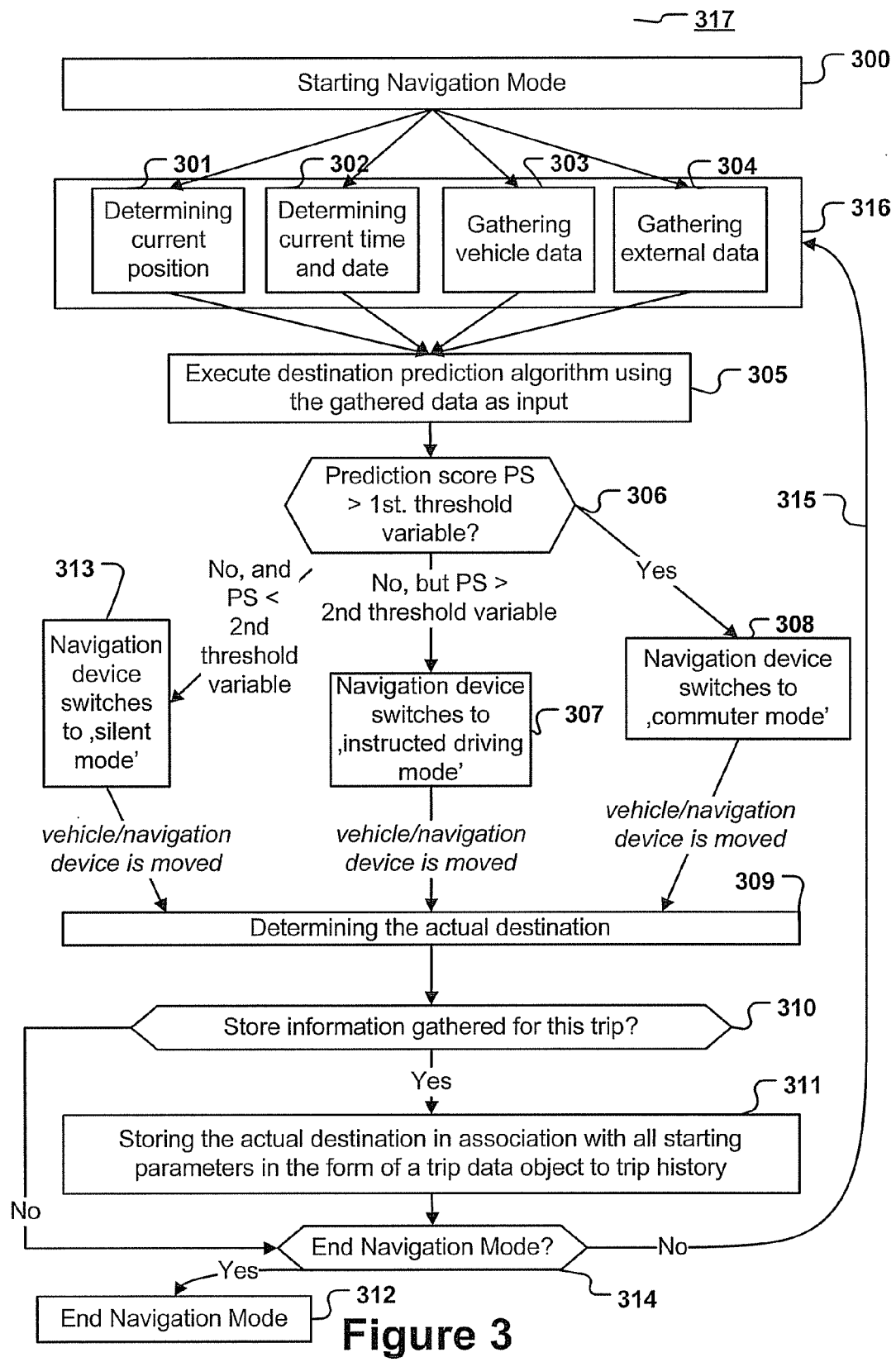
FIG. 3 is a flowchart illustrating the operation of the navigation device in navigation mode.
Figure 5:
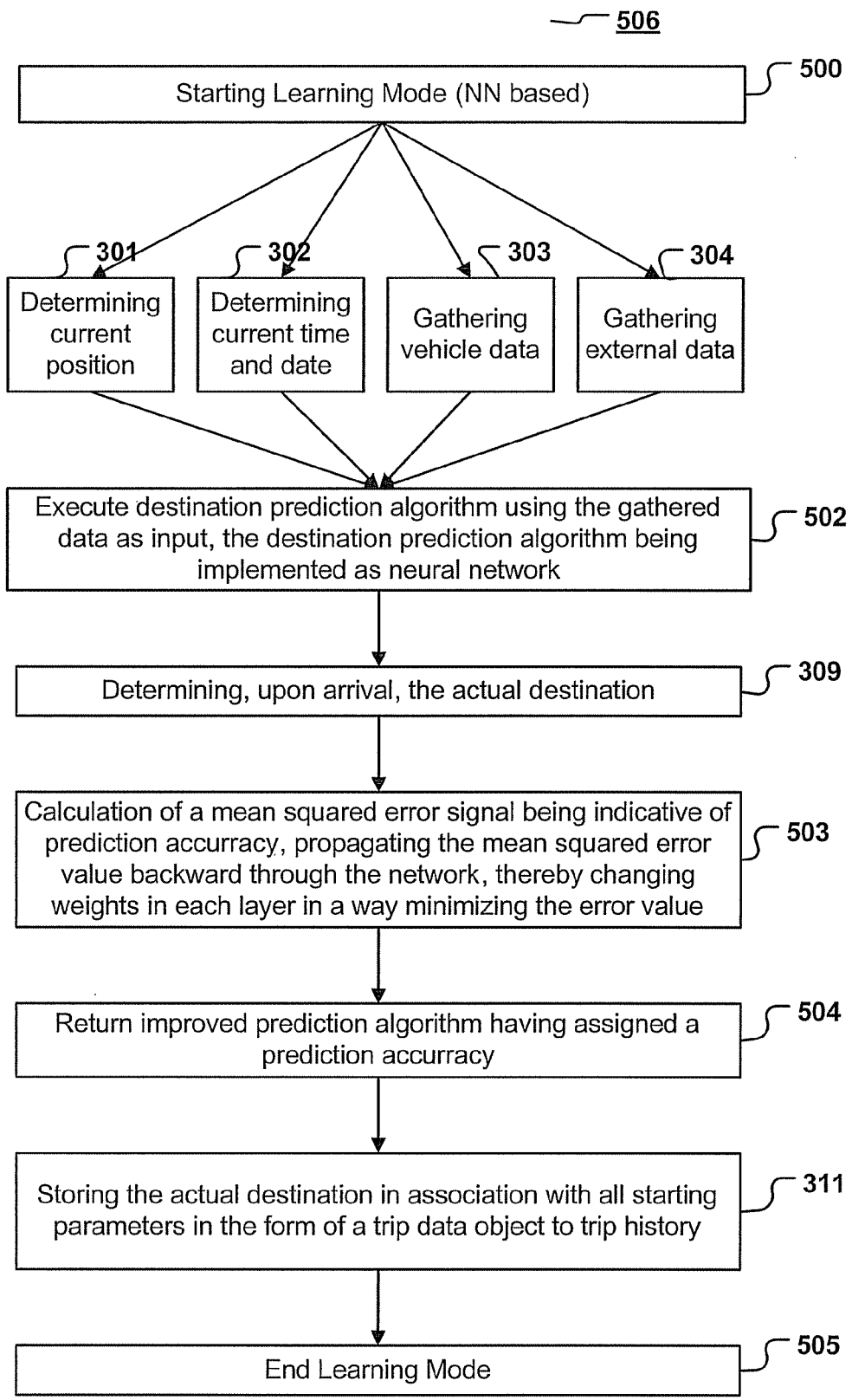
FIG. 5 is a flowchart illustrating the operation of the navigation device wherein the destination prediction algorithm is a neural network in learning mode.

FIG. 3 is a flowchart illustrating the operation of the navigation device in navigation mode while FIG. 5 shows a workflow of an embodiment operating in 'learning mode'. Both modes of operation are not mutually exclusive. Per default, both modes run in parallel at the same time. Thus, the navigation device according to embodiments of the present invention predicts a destination at start based on the existing destination prediction algorithm but at the same time learns and improves the accuracy of the prediction algorithm by feeding the information gathered in the current trip in the form of a new trip data object into the trip history. The trip history is used as data basis for training or re-training the learning algorithm or for applying statistical calculations to reveal probability values for different destinations given the trip history. According to embodiments of the invention, the user is provided with a hardware- or software based switch to selectively disable or enable each of the navigation and learning modes for a particular trip. For example, if the vehicle is lent for some weeks to a colleague, the owner may not want his trip history to comprise in addition the trips executed by his colleague, and he may not want that the learning algorithm gets used to the driving pattern of this colleague, thereby reducing the accuracy of the algorithm to predict the destination the user will choose.

FIG. 3 illustrates the steps executed in navigation mode by the destination prediction module 208. The navigation mode is started e.g. upon turning on the vehicle or the navigation device. At first, the current position is determined in step 301 via the position determination unit 209 for determining the current position, e.g. a GPS receiver. In addition, the current time and date is determined in step 302 by the clock 210. According to some embodiments of the invention, the date is used to determine the day within the week, and to determine if the current day is a working day, Saturday, Sunday or a public Holliday. The information gathered in steps 301 and 302 are the minimum amount of data that has to be acquired by the destination prediction module in order to execute a prediction of the destination by using the prediction algorithm in step 305.

According to the embodiment of the invention depicted in FIG. 3, the accuracy of the destination prediction is further improved by gathering additional information on the starting conditions, e.g. vehicle data. The vehicle data is gathered in step 303 by interface 215. External data, e.g. weather data, is gathered in step 304. The totality of starting parameters gathered in steps 301, 302, 303 and 304 is used as input when executing in step 305 the destination prediction algorithm 207.

In decision step 306, the navigation device determines, if the prediction score of the predicted destination having assigned the highest prediction score is above a first and a second prediction score threshold variable.

In case the prediction score of the destination with the highest prediction score has exceeded a first prediction score threshold variable, the navigation mode turns at decision point 306 into 'commuter mode'.

If the prediction score of said predicted destination is lower than the first prediction score threshold variable, but higher than a second prediction score threshold variable, the navigation device switches to 'instructed driving mode' in step 307.

In case the predicted destination with the highest prediction score has a prediction score below said second prediction score threshold variable, the navigation device turns into 'silent mode' in step 313.

If the navigation device has turned into commuter mode, the navigation device in step 308 does not instruct the user when to turn to his right or left on every crossing except from extraordinary situations. The navigation device rather indicates only information which can be considered as useful even for people well familiar with a particular route, e.g. current traffic announcements.

If the navigation device switches in step 307 to instructed driving mode, the navigation device suggests the user one or multiple predicted destinations having a prediction score above the second prediction score threshold variable. After the user has selected a predicted destination, the navigation device indicates precisely, e.g. via a voice, which direction and road to take at each crossing or slip road.

In case the prediction score of all predicted destinations are below a second prediction score threshold variable, the navigation device switches to 'silent mode' in step 313 and does not suggest a destination to the user.

The term 'instructed driving' or 'commuter mode' does not imply that the vehicle has to be a car. Other embodiments of the invention are adapted to the requirements e.g. of bicyclers and pedestrians, but those user groups also profit from multiple different operation modes of the navigation device, one giving detailed instructions and the other mode providing only information considered as relevant also by users familiar to a particular route.

In step 309, the actual position of the navigation device is determined upon arrival at the destination or upon arrival at an implicit destination. The arrival at an implicit destination is determined automatically by the navigation device after having moved the vehicle and/or the navigation device for a particular time interval or along a particular distance. The frequency of determining the current position in step 309 varies depending on the embodiment of the invention, but at least at the starting position and upon arrival at a destination the current position has to be determined. The arrow 315 indicates that the process of determining current starting parameters in the set of steps 316, the switching between different operation modes of the navigation device and the storage of new trip data objects in the trip history can be executed repeatedly along a trip in case multiple implicit destinations are determined during the trip. In decision 310 it is determined if the user has enabled the learning mode. If so, a new trip data object is created comprising all gathered starting parameters and the actual destination and stored in step 311 to the trip history. In decision 314 it is determined if navigation mode is to be ended or not. According to some embodiments of the invention, turning off the navigation device or the vehicle are signals for ending the navigation mode. Typically, those signals indicate that the driver has reached his final destination. Navigation mode is ended in step 312.

In case those signals are absent, the actual position determined in step 309 may be an implicit destination and the prediction cycle may start again as indicated by arrow 315. In case the user has disabled learning mode the new trip data object is not stored to the trip history 203.

Figure 4:
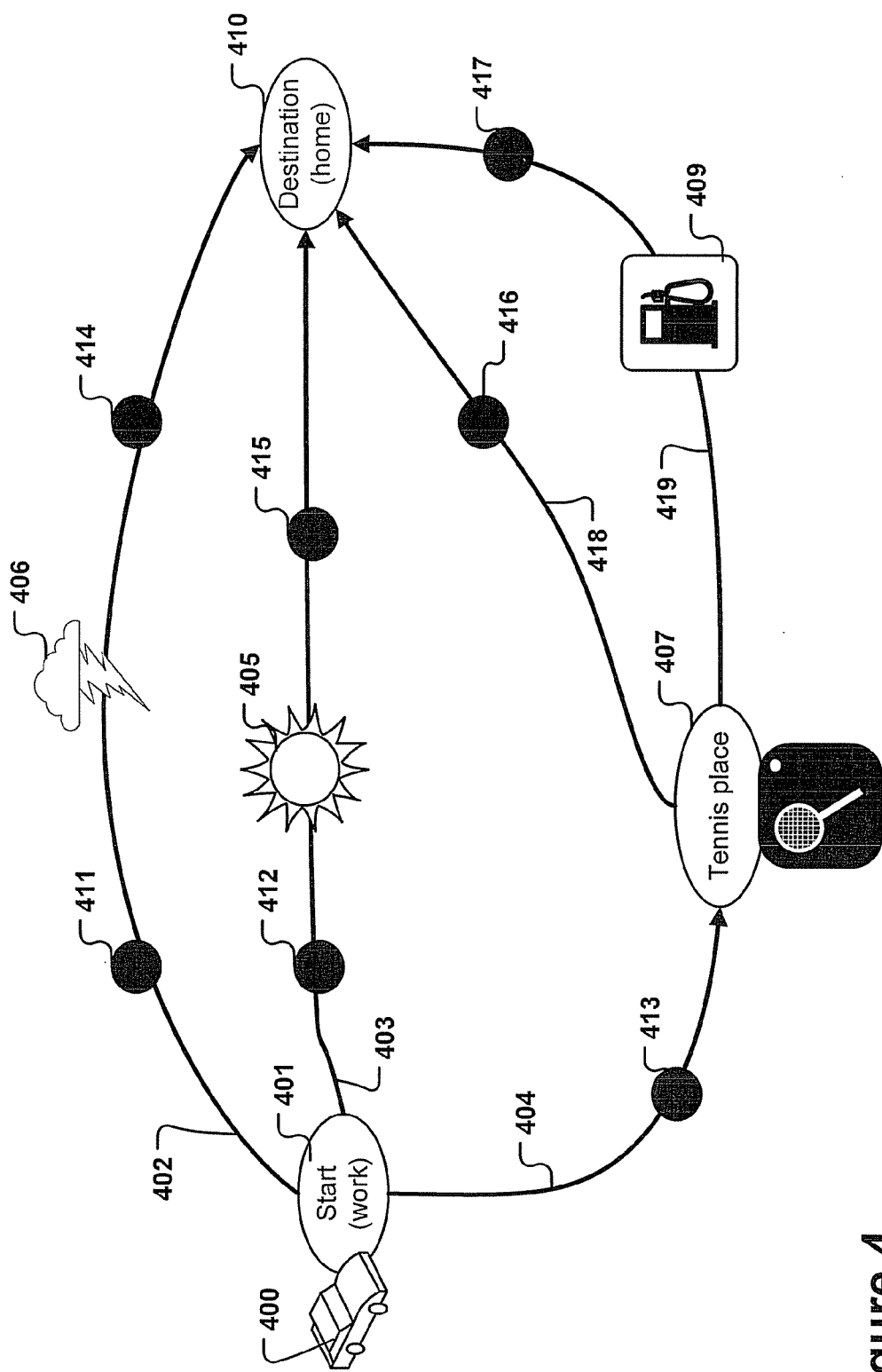
FIG. 4 illustrates a set of routes, connecting a start position with explicit and implicit destinations.

FIG. 4 illustrates a set of routes connecting a start position 401 with explicit 407, 410 and implicit 409, 411, 312, 413, 414, 415, 416, 417 destinations. A vehicle 400 comprises a navigation device according to one embodiment of the invention.

Explicit destinations are destinations the user has once entered explicitly into his navigation device as destination. Implicit destinations are destinations the user does not explicitly enter or even considered to be a destination. Implicit destinations are locations along routes the navigation device has determined automatically during a trip along a road. The implicit destinations are determined automatically after having traveled a predetermined amount of way or time, e.g. every second mile or every five minutes. Whenever an implicit destination is reached, the learning module considers a trip as finished, stores the starting parameters of the previous starting point together with the location of the current destination point as trip data object to the trip database. The current destination point is then considered as new starting point, and again the time, the date, the location and additional external, application or vehicle data is collected to generate a new implicit or explicit set of starting parameters and to predict a new destination based on this data. The benefits provided by this feature are twofold:

For the one hand, this feature allows the destination prediction algorithm not only to predict the explicit destinations or the real destinations the user will stop his vehicle at, but to predict also the route preferred by the user. For example, the user of the vehicle 400 drives every working day from his working place 401 to the explicit destination 410 at 6 p.m. Multiple different routes 402, 403, 404 can be chosen all leading to his destination 410. For example, the user plays tennis after work every Wednesday evening. The algorithm therefore predicts with high accuracy when starting on a Monday, Tuesday, Thursday or Friday from 401 at about 6.00 p.m., that the destination of the driver of vehicle 400 will be his home 410 and that the destination will be the tennis place 408 if the current day is a Wednesday. The driver uses route 402 whenever the weather is bad and stormy as he considers that route as less dangerous when visibility conditions are bad. When the weather is good, he uses route 403. By determining implicit destinations automatically, the destination prediction algorithm is able to predict different routes depending on the weather.

This discrimination is not possible by considering only the explicit final destination, because the driver of car 400 will every Mo, Di, Thu or Fr drive to home 410 irrespective of the weather. Whether he drives to the implicit destination 411 or 412, however, strongly depends on the weather. This discrimination between multiple different routes is advantageous, as the traffic announcement can be requested and displayed more selectively for a particular route and a potential trip accompany can be found via a trip sharing service which wants to be picked-up or dropped off somewhere along one of the two possible routes 402, 403. A further advantage, the provision of sub-route specific accuracy scores for destination prediction, is explained in greater detail in FIG. 7.

After having finished playing tennis, the driver of vehicle 400 comprising a navigation device according to one embodiment of the invention always drives to home 410. The navigation device has, in many previously executed trips from 407 to 410 automatically determined the implicit destinations 416 and 417 which now provide the navigation device now with the possibility to predict with high accuracy that the user of the vehicle 400 will always take the shorter route 418 provided that his gas tank contains a minimum amount of gas, otherwise, he will use route 419. The amount of gas considered as sufficient to still choose route 418 depends on the willingness of the driver to take the risk of running out of gas and differs from person to person. This is not of a problem for the destination determination algorithm as the gas level below which the user of vehicle 400 uses route 419 passing a gas station is learned from the trip history.

FIG. 5 is a flowchart illustrating the operation of the navigation device in learning mode. The steps required to learn to predict the destination a user will chose given some starting parameters depicted in this figure refer to an embodiment of the invention wherein the learning algorithm is implemented as "feed-forward back-propagation network" neural network architecture. Provided the learning mode is enabled, the learning mode is started e.g. when turning on the navigation device or when reaching an implicit or explicit destination. Starting parameters are gathered in steps 301-304 as described previously. Each starting parameter comprises a weight depending on its type. A type of a starting parameter could be, for example, "current outdoor temperature", "time", "date", "day in week", "level of gas in gas tank" and the like.

The trained neural network predicts in step 502 a destination given the current starting parameters. The training has been accomplished previously on the whole set of trip data objects available in the trip history at the moment of training In step 309, the actual location is determined upon arrival at an explicit or implicit destination. The arrival at an explicit destination could be indicated by the driver explicitly e.g. by pressing a button or turning off the navigation device or the vehicle. Implicit destinations are determined automatically by the navigation device. In step 503, a mean squared error signal being indicative of the accuracy of the destination prediction is calculated. The weights of the starting parameters are adapted in each layer of the network by the back-propagation algorithm to minimize a mean squared error value. The mean squared error signal value is propagated backward through the network, thereby changing weights in each layer in a way minimizing the error value. Provided the driver shows a steady driving behavior regarding his chosen destinations, the prediction accuracy will increase upon every added new trip data object and every re-training of the neural network on the increased set of trip data objects. The actual destination is stored in association with all starting parameters of the trip to trip history in step 311. The re-trained and improved version of the destination prediction algorithm 207 is returned in step 504 from the learning module 206 to the destination prediction module 208. In step 311, the gathered starting parameters are stored in association with the actual destination to the trip history.

According to preferred embodiment of the invention, the learning mode and the navigation mode are both executed in parallel on the navigation device if the user has not disabled explicitly one of said operation modes. The trip data objects are not stored twice. The set of steps executed in both operation modes depicted in FIGS. 3 and 5 in part overlap, and this overlap of steps has not been introduced in FIGS. 3 and 5 to indicate multifold execution of the same step, but to indicate the logical sequence of steps necessary to reach the desired effect: to predict a destination and direct the vehicle to this destination on the one hand and to improve the prediction accuracy by learning from the data provided by finished trips in the trip history on the other hand.

As has been noted previously, according to some embodiments the learning module 206 and the destination prediction module 208 are implemented as one monolithic block of software. A person skilled in the art knows how to implement program modules e.g. for generating and storing new trip data objects that can be used by both modules 206 and 208 without causing duplications in the set of trip data objects stored to the trip history. The learning module is ended e.g. by turning off the navigation device, disabling the learning mode or the like.

Figure 6:
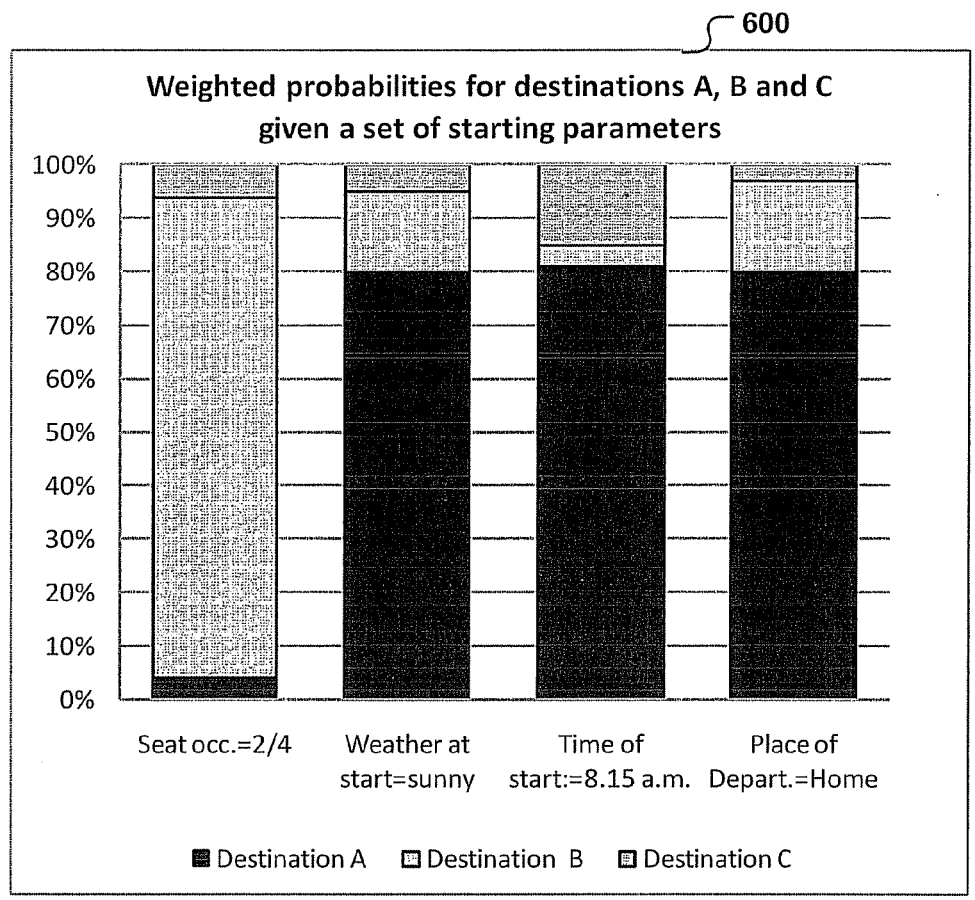
FIG. 6 is a bar chart illustrating probabilities for three destinations A-C given a set of starting parameters.

FIG. 6 is a bar chart illustrating probabilities for three destinations A-C given a set of starting parameters, which is calculated according to another embodiment of the invention, wherein the destination prediction algorithm 207 is based on a statistical evaluation of all trip data objects of the trip history 203. According to this embodiment, the starting parameters are gathered at start as described previously. In the example illustrated in FIG. 6, four types of starting parameters are gathered: the seat occupation in the vehicle, the weather at start, the starting time and the place of departure. A person skilled in the art knows how to appropriately represent each of those different parameter types numerically in an adequate way. For example, for the purpose of destination prediction, it make sense to define time spans of about 15 or 30 minutes as the departure time usually is not exact to the minute the same for a particular destination. The weather data may be grouped into a limited set of categories, e.g. sunny, cloudy, rainy, stormy, and the like, each category being represented by numerical values, e.g. 1, 2, . . . 7 or the like. The place of departure does not refer to a single point on a geographic map bat rather to an area of a particular radius, as the car may be parked each evening at a different parking lot in the vicinity of the driver's home.

TABLE 1

Probability to choose a particular destination given a particular starting parameter value

| Starting Parameter Type | Starting Parameter Value | Destination A | Destination B | Destination C |
|---|---|---|---|---|
| Seat Occupation | 2 out of 4 seats | 4% | 90% | 6% |
| Seat Occupation | 1 out of 4 seats | 10% | 95% | 5% |
| Weather at start | sunny | 80% | 15% | 5% |
| Time of start | [8.00 a.m.-8.30 a.m.] | 81% | 4% | 15% |
| Place of departure | Home | 80% | 17% | 3% |

Table 1 comprises a set of four types of starting parameters gathered: the seat occupation in the vehicle, the weather at start, the starting time and the place of departure. For each starting parameter type, at least one particular value is given in the second column. For the parameter type 'seat occupation', two starting parameter values are given, "2 out of 4" and "1 out of 4". The data in each line of table 1 indicates the probability that a driver of a vehicle will chose destination A as actual destination given a particular starting parameter value. The determination of those probabilities is, according to a preferred embodiment of the invention, determined by the application of basic statistical algorithm. For example, if the trip history comprises 100 trip data objects of trips having been started when the weather was sunny, whereof 80 trip data objects comprised the destination "A", 15 trip data objects comprised the destination "B" and 5 trip data objects comprised the destination "C", then the probability of the driver of choosing destination B when the weather is sunny is calculated to be 15%. The probabilities for choosing "A" or "B" as destination given a starting time in the range of 8.00 a.m.-8.30 a.m. is calculated analogously from the destinations stored to all trip data objects having a starting time within the same time frame.

According to the destination prediction algorithm of the embodiment depicted in FIG. 6, the starting parameter types have assigned a weight. It can usually be assumed that the starting time and location of the start are better predictors of the destination of a trip than the weather.

TABLE 2

Weight of starting parameter types

| Starting Parameter Type | Starting Parameter Type Weight |
|---|---|
| Seat Occupation | 0.10 |
| Weather at start | 0.05 |
| Time of start | 0.45 |
| Place of departure | 0.40 |

The starting parameter type weights are used in the next step to determine weighted probability to choose a particular destination given a particular starting parameter value. For example, 90 out of 100 trip data objects having a seat occupation of 2/4 have assigned, according to table 1, destination "B". As the weight of the seat occupation on the total score is, according to table 2, only 10%, the weighted probability to choose destination "B" given a seat occupation of 2/4 is 9% (table 3). In a further step, for each destination A—C, a sum of the weighted probabilities is calculated, e.g. for destination A: 0.4%+4%+36.5%+32%=72.9%. In a final step, the summed weighted probabilities may be normalized to add to 100% altogether: To normalize the weighted probability sum of destination "A" having 72.9%, the normalized score value would be calculated as 72.9%/(72.9%/+18.4%+8.8%) =72.9%/100.1=72.8%. (For the figures given in this particular example, the difference between the normalized and the not-normalized value is small, but this is not necessarily the case for other examples).

TABLE 3

Weighted probabilities of a user of a navigation device to choose a particular destination given a particular starting parameter value; (Normalized) sum of weighted probabilities for each destination.

| Starting Parameter Value | Starting Parameter Type Weight | Destination A | Destination B | Destination C |
|---|---|---|---|---|
| Seat occ. = 2/4 | 0.10 | 0.4% | 9.0% | 0.6% |
| Weather at start = sunny | 0.05 | 4.0% | 0.8% | 0.3% |
| Time of start: = 8.15 a.m. | 0.45 | 36.5% | 1.8% | 6.8% |
| Place of Depart. = Home | 0.40 | 32.0% | 6.8% | 1.2% |
| Sum of weighted probabilities | | 72.9% | 18.4% | 8.8% |
| Normalized sum of weighted probabilities | | 72.8% | 18.4% | 8.8% |

According to the embodiment whose destination prediction algorithm is illustrated in tables 1-3 and FIG. 6, for each type of starting parameter and for each known destination a probability value is calculated, the probability value indicating the probability that the known destination will be the actual destination given a particular starting parameter value. Each parameter type is weighted. An overall probability sum is calculated for each known destination by summing up the weighted probabilities for each known destination given the current starting parameters values. The set of known destinations can comprise only those destinations having been explicitly entered by the user into the navigation devices but may, according to further embodiments, comprise also destinations not having been explicitly entered by the user of the navigation device. Destinations not having been explicitly entered by the user of the navigation device are, for example, real destinations at which the vehicle was stopped and the user left the vehicle, and implicit destinations as explained and depicted in FIG. 4.

According to the final, normalized probability values of table 3, the user will chose destination A given the listed set of starting parameters with a probability value, which is in this case taken as accuracy value, of about 73%. The seat occupation would clearly have suggested another destination (B), but the weight of this feature is lower than the time and location which both indicate A to be the most probable destination.

The usage of neural network based prediction algorithms is that the weighting of the starting parameters is learned and adapted in a user-specific way. Some users may regard the weather as important factor when choosing a route or destination while other users may not. The neural network based solution is therefore more flexible. On the other hand, the statistics-based approach as described in the text section corresponding to FIG. 6 does not require a computationally expensive re-training of a neural network. The "learning" effect in the statistics-based method lies in applying the same statistical calculations on an ever growing amount of trip data objects, thereby providing a destination prediction algorithm with increasing accuracy.

The interface for receiving the seat occupation vehicle data and the navigation device constitute a system of hardware and software components being operable to detect the position and number of occupied seats. The persons acting regularly as passengers, e.g. the children, friends or mates of the driver usually occupy always the same, preferred seat. Therefore, not only the number but also the position of the occupied seat may be a strong indicator of the destination chosen by the driver.

Figure 7:
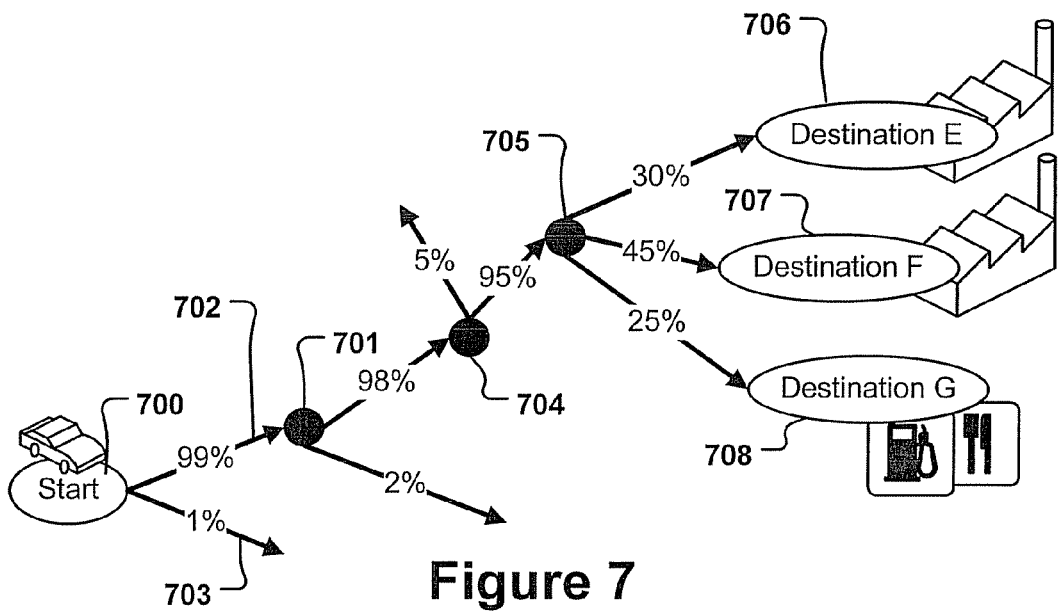
FIG. 7 illustrates destination prediction accuracy values for multiple explicit and implicit destinations.

FIG. 7 illustrates destination prediction accuracy values for multiple implicit destinations. FIG. 7 illustrates the second beneficial aspect provided by considering also implicit, automatically determined destinations: it is possible to determine the next implicit destination with high accuracy, although the final destination of the user may be unpredictable. For example, the driver of the vehicle comprising a navigation device according to an embodiment of the invention is a controller working sometimes (~30%) in office building E 706 and sometimes (~45%) in office building F 707. He has a long way to commute from home to either of the two office buildings and therefore often (~25%) has to drive to gas station G 708. (The exact calculation of the probability to drive to destination E would be calculated as 0.99*0.98*0.95*0.3=0.28) As the pattern of working at different offices in unpredictable and as his navigation device does not have an interface to the gas tank of this vehicle, the learning algorithm is not able to predict with sufficient accuracy which of the destinations 706-708 the driver will indeed chose each morning. But for each implicit destination 701, 704 and 705, the prediction algorithm can predict with high accuracy that the user will drive to those implicit destinations provided the user starts the vehicle and turns on his navigation device on the morning of a working day. Although the prediction algorithm cannot, due to the unpredictable traveling pattern of the controller, predict the final destination 706-708 with sufficient accuracy to submit a request to a trip sharing service inviting other persons to join the whole trip, the navigation device can submit to the trip sharing service at least the predicted route to the implicit destinations 701-705. Implicit destination 705 is the farthest possible predictable destination in the depicted example. The destination of each sub-trip (sub-trip 1 leading from the user's starting point 700 to implicit destination 701, sub-trip 2 leading from implicit destination 701 acting as starting point to implicit destination 704, and sub-trip 3 leading from implicit destination 704 acting for sub-trip 3 as starting point to implicit destination 705).

As a result, the driver may take part in the trip sharing service and offer other persons a free seat at least until he reaches implicit destination 705.

As all the probability values depicted in FIG. 7 were calculated given the starting parameters available at start 700, it may well be possible that during the trip, e.g. at intermediate destinations 704 or 705, the calculation is more accurate, because the calculation executed when passing implicit destinations 704 and 705 will take other parameter values as starting parameters and input for the destination prediction algorithm. The time may differ significantly from the current time at start 700, there may be more or fewer car seats occupied at 704 than at 700 or the weather may have changed which may all have an influence on the destination prediction accuracy.

Figure 8A:
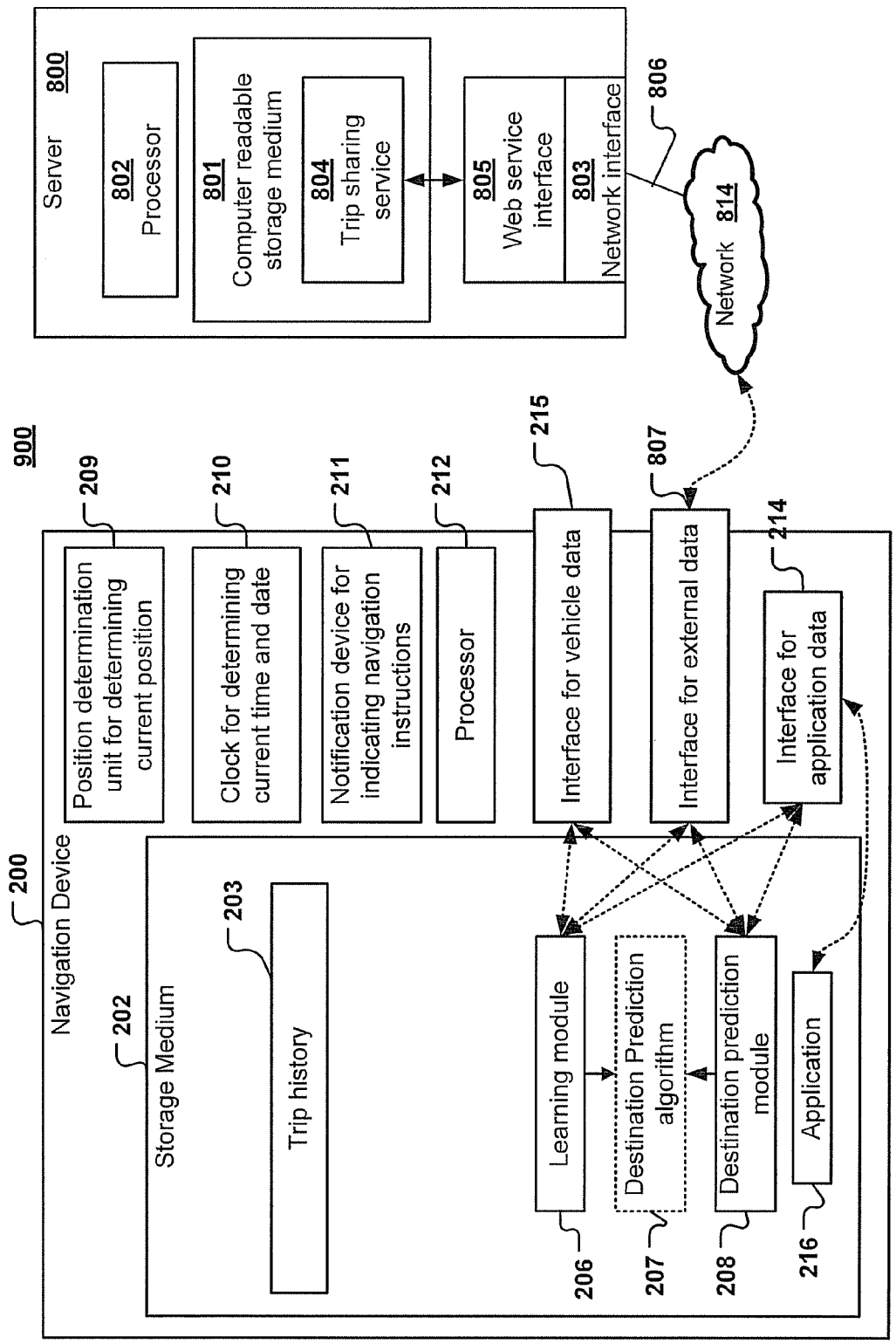
FIG. 8a illustrates a computer system of a trip sharing service called by a navigation device, the call being initiated by a prediction of a destination of a trip.
Figure 8B:
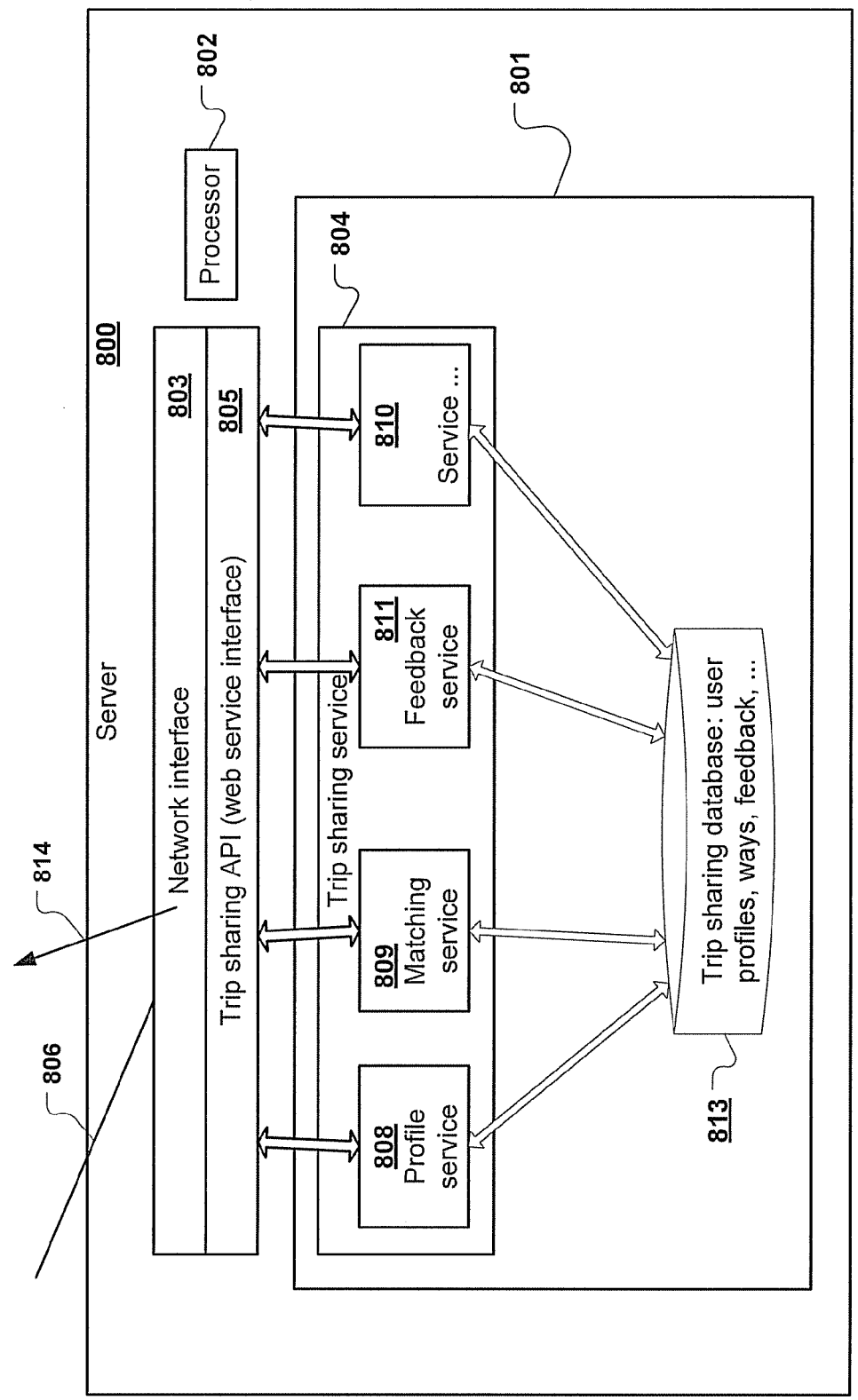
FIG. 8b illustrates the trip sharing service hosted on a trip sharing server in greater detail.

FIGS. 8a and 8b depict the system architecture of a trip sharing service 804 according to a further embodiment of the invention. The trip sharing service is called by the navigation device 200. A service request 806 is submitted via interface 807 of the navigation device to web service interface 805 provided by the trip sharing service 804. The physical network connection is established on the server side by network interface 803, e.g. an Ethernet card, WLAN adapter or any other component providing a physical connection for data exchange with other processing devices. The logical interface provided by the trip sharing service is a web service interface. The term 'web service' includes web services in the strict sense, e.g. RESTful web services, but includes also the exchange of data via SMSs, Http requests, remote procedure calls (RPC), CORBA, DCOM, RMI or any other communication technology. The term web service also includes data exchange via RDS, satellite link, e-mails or SMS interface or via instant messaging based e.g. on XMPP/Jabber or via web services in the strict sense, conforming to the specification of the world wide web consortium (W3C). The trip sharing service comprises multiple software modules referred to as adaptors to represent the obtained results in a multitude of formats, e.g. as SMS, e-Mail or XML page.

The navigation device is connected to the server 800 via a network 814, e.g. the Internet. In operation, the user of the navigation device starts a trip, e.g. by turning on the navigation device. The navigation device determines its current position and uses this information to specify the starting point. In addition, the navigation device determines the current time and date and may in addition gather external data, application data or vehicle data to predict a destination. In case a destination could be predicted with sufficient accuracy (provided the prediction accuracy of the destination prediction algorithm was higher than a minimum accuracy threshold), a request 806 is sent automatically or upon user-confirmation to the trip sharing server. The submitted request comprises data on the predicted trip, in particular the starting time, the starting point and the destination. The trip sharing service receives the request via its physical 803 and logical 805 interfaces and creates a 'server-side trip data object'. The trip sharing service has access to a non-transitory computer-readable storage medium, e.g. 801 such as, but not limited to, any type of disk including optical disks, magnetic-optical disks, read-only memories (ROMs), random access memories (RAMs). Said storage medium 801 according to the depicted embodiment hosts a trip sharing service database 813 comprising a multitude of 'server-side trip data objects', each server-side trip data object representing a planned trip of one of its registered users. According to other embodiments of the invention, the database 813 is hosted on a different server, e.g. a database server (not shown). After receiving the service request by the trip sharing service, a profile service 808 is invoked for assigning a user profile to the service request. The profile service has access to the database 813 comprising, among other data, also user profiles. A user profile comprises multiple attributes, e.g. the real name of the user, his date of birth, his e-mail address, and may comprise additional parameters specifying e.g. driver/passenger preferences of the user. After having created the server-side trip data object, the trip sharing service executes a matching method, which is part of the matching service 809.

In this matching method, the trip sharing service tries to find other persons traveling at the same or a similar time to the same destination like the user of the navigation device 200. In addition to the trip specifications, each server-side trip data object comprises user-specific data, e.g. the user's taste in music, the age, the gender, the price the user is willing to pay per mile in the role of a passenger and the minimum price a user wants to receive from a passenger in the role as a driver. Each of the server-side trip data objects is represented as multi-dimensional feature vector. During the execution of the matching method, the server-side trip data object having been created after receiving the request from the navigation device, here referred to as first server-side trip data object, is compared against all existing server-side trip data objects in database 813, here referred to as second server-side trip data objects. Each comparison of the first server-side trip data object with a second server-side trip data object results in a matching score. After having compared the first server-side trip data objects with all existing second server-side trip data objects, a result list is created comprising all second server-side trip data objects having reached in the comparison step a matching score above a minimum matching score threshold. The result list of second server-side trip data objects is sorted in descending order according to the matching score, and the user corresponding to the best matching second server-side trip data object, here referred to as second user, is allocated as potential trip accompany to the first user submitting the service request via its navigation device. Depending on the preferences of each user, the allocation as trip accompanies can be executed by the trip sharing service automatically or upon confirmation.

According to a further embodiment of the invention, the user profiles of database 813 of the trip sharing service is operable to be populated via an automatic import of user profiles of various social networks, e.g. Facebook, via an import of lists of employee profiles of a company, via an import of LDAP directories or an import of user profiles stored according to any other data format. The import is executed by software modules being operable to read the user profiles from a source data repository and to store them to the database 813 of the trip sharing service. This feature is advantageous, as the user specific settings used in the matching method of the trip sharing service may comprise the option for a preferential matching of users being member of the same social network or company. If a company uses the trip sharing service to reduce expenses, preferentially employees from the same company will be matched by the matching service 809. Only in case there are car seats left which cannot be assigned to employees of the same company, persons outside the company may be accepted by the matching service in this scenario.

The comparison of two server-side trip data objects is implemented as a comparison of two multi-dimensional vectors. Each dimension of a vector represents one specification of the corresponding server-side trip data object, e.g. the smoking preference of the user or his taste in music. According to further embodiments of the invention, each dimension is associated with a weight. The comparison of vectors has the advantage that the run time behavior of the algorithm is very fast, because it is of linear complexity. Even in case the database of the trip sharing service comprises millions of server-side trip data objects, the result will still be returned quickly. The growth of the number of available trip data object in the database will result in a linear increase of processing time of comparing the new vector with all existing vectors in the database to determine the degree of congruency. According to further embodiments of the invention, the comparison of server-side trip data objects is implemented as an execution of weighted rules which determine for each available specified parameter of the two compared trip sharing data objects the degree of congruency.

A server-side trip data object and its corresponding vector comprise specifications of a multitude of trip related and user related features. Each particular specification or feature of a server-side trip data object corresponds to one dimension of the vector. A first dimension could, for example, represent the smoking habits of a user, a second dimension the user's taste in music and the third dimension the earliest acceptable starting time. Each dimension has assigned a weight. The weight of some of the features, e.g. the taste in music, is thereby specified by the user in his user profile. The weight determines the impact of each dimension on the overall matching score. The overall matching score obtained by comparing the vectors of two potential trip data objects of two different users. The similarity of two vectors is determined based on the angle between vector components in a multi-dimensional space. The number of dimensions of that multi-dimensional space corresponds to the number of dimensions of the server-side trip data object of each compared vector. The smaller said angle, the more similar are both multi-dimensional vectors to each other, and the higher the weight of a particular dimension, the higher the impact of that dimension on the similarity score of two vectors. The weighted similarity score between two vectors is in the following referred to as matching score.

The driver/passenger preferences are also represented as dimensions of said multi-dimensional vector: in case one user acts preferentially as driver and the second user preferentially acts as passenger, the matching method determines a higher matching score for server-side trip data objects having mutually fitting driver/passenger preferences. This does, however, not guarantee that the user preferring to act as driver will indeed be assigned the driver role at the end of the matching method.

In the matching process the degree of congruency is determined by the trip sharing service and represented as matching score. Said feature provides the user with the possibility to specify thresholds for the matching score. Matching server-side trip data objects and their corresponding users, in the following referred to as 'matching users', reaching a matching score which exceeds a threshold can, for example, be automatically assigned as trip accompanies by the trip sharing service after having executed the matching method on all server-side trip data objects of the database 813. At least the contact data of the allocated user is returned by the trip sharing service 804 to the navigation device 200 via its interface 807. According to a further embodiment of the invention, the assigned trip accompany whose contact data was returned by the trip sharing service is indicated by the notification device 211 for indicating navigation instructions, e.g. a touch screen, to the user of the navigation device, thereby telling the user e.g. where to pick or how to contact the allocated trip accompany.

In case the matching score between two users is high enough, each user is assigned a driver and a passenger role. In most cases, the user having the greater preference to act as driver will be assigned the driver role. In case both users have equal driver/passenger preferences, the driver role will be dynamically assigned to that user with less detour to pick-up the other. This feature of the matching method reduces the distance that has to be driven in total: in case the user lying farthest apart from the destination location is assigned the driver role, he can pick-up one or more passengers along his route to the destination location of the trip. In case the user lying next to the destination location would have been assigned the driver role, said user would at first have to drive in the opposite direction of the destination location to pick-up other users. In case one of the users is a categorical driver or passenger, the roles cannot flexibly be assigned to the users. In the following, the user having been assigned the role of the driver will be referred to as driver. The user having been assigned the role of the passenger will be referred to as passenger.

The driver/passenger specification of a user increases his chance of having assigned the preferred role by the matching method. This results in the following scenario:

A user starts his navigation device to begin his daily trip to work. The navigation device predicts with high accuracy that he will drive to work and automatically submit a request to the trip sharing service, the request comprising the trip specifications, in particular time and place of departure and the predicted destination. On the server side, his request is transformed into a server-side trip data object which is compared against all existing server-side trip data objects. In case of a match with a server-side trip data object corresponding to a person preferentially acting as passenger, the navigation device will inform the owner of the navigation device 200 on the pick-up time of the passenger. In case a match was found with a person being even more keen on acting as driver than the user owning the navigation device, the owner of the navigation device is notifies on the existence of the other user driving the same direction being willing to pick him up. Alternatively, the owner of the navigation-device could have specified in his user preferences of the trip sharing service, never to act as passenger. In this case, he will only be notified on persons having the same or a similar destination who are willing to act as passengers.

According to a further embodiment of the invention, the user can specify, e.g. in his user profile of the trip sharing service 804, that the result generated by the called service shall be returned via different second interfaces depending on the time span that is left between the generation of the result (a trip event associated with at least one matching user profile) and the begin of the trip event. For example, the user can specify to receive the result via an e-mail interface one day before the trip starts. In addition, or alternatively, the user can specify that the server should return the result per SMS one hour before the trip starts.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

ABBREVIATIONS

| | |
|---|---|
| GPS | Global Positioning System |
| LPS | Local Positioning System |
| SVM | Support Vector Machine |
| NN | Neural Network |
| LDAP | Lightweight Directory Access Protocol |
| POI | Point Of Interest |

LIST OF REFERENCE NUMERALS

| | |
|---|---|
| 101 | smart phone |
| 102 | notebook, netbook |
| 103 | mobile phone |
| 104 | navigation device |
| 200 | navigation device |
| 201 | trip data object |
| 202 | storage medium |
| 203 | trip history |
| 204 | starting parameter |
| 205 | actual destination of a trip represented by trip data object 201 |
| 206 | learning module |
| 207 | prediction algorithm |
| 208 | destination prediction algorithm |
| 209 | position determination unit |
| 210 | clock for determining current time and date |
| 211 | notification device for indicating navigation instructions |
| 212 | processor |
| 213 | interface for external data |
| 214 | interface for application data |
| 215 | interface for vehicle data |
| 216 | other application running on navigation device |
| 300-309 | steps |
| 310 | decision |
| 311-313 | steps |
| 314 | decision |
| 315 | arrow |
| 316 | set of steps |
| 317 | method |
| 400 | vehicle with navigation device |
| 401 | start |
| 402 | route |
| 403 | route |
| 404 | route |
| 405 | route is chosen in case of sunny weather |
| 406 | route is chosen in case of bad weather |
| 407 | tennis place |
| 409 | gas station |
| 410 | destination |
| 411-417 | implicit destinations |
| 418 | route |
| 419 | route |
| 500-505 | steps |
| 506 | method |
| 600 | bar chart |
| 700 | start |
| 701 | implicit destination |

-continued

| | |
|---|---|
| 702 | sub-route from start to implicit destination 701 having a probability to be chosen of 96% |
| 703 | other destination with 4% probability to be chosen given current starting parameters |
| 704 | implicit destination |
| 705 | implicit destination |
| 706 | destination/office E |
| 707 | destination/office F |
| 708 | destination/gas station G |
| 800 | server (hosting trip sharing service) |
| 801 | computer-readable, non-transitory storage medium |
| 802 | processor |
| 803 | network interface |
| 804 | trip sharing service |
| 805 | web service interface of trip sharing service |
| 806 | service request |
| 807 | interface for external data |
| 808 | profile service |
| 809 | matching service |
| 810 | other service |
| 811 | feedback service |
| 813 | trip sharing database |
| 814 | network |
| 900 | data processing system |

What is claimed is:

1. A navigation device for predicting a destination of a trip, the navigation device comprising:
a position determination unit for determining the current position of the navigation device;
a clock unit for determining the current time and date;
a computer-readable non-transitory data storage for storing a trip history, the trip history comprising a set of trip data objects, each trip data object representing a past trip and comprising starting parameters and an actual destination of the represented trip, the actual destination being the destination chosen and reached by a user of the navigation device, the starting parameters comprising at least:
a starting time and date of the trip, and
a starting point of the trip;
a learning module for generating a destination prediction algorithm, the destination prediction algorithm being generated by using information of the trip history;
a destination prediction module for predicting the destination of the trip, thereby using the destination prediction algorithm, the destination prediction algorithm being operable to predict the destination of the trip by using the starting parameters of the trip;
wherein the destination prediction algorithm is to calculate prediction scores for corresponding predicted destinations; wherein the navigation device is to use a value of the highest score among the prediction scores to select a navigation mode among a plurality of navigation modes;
a processor for executing read/write operations on the data storage and for executing instructions of the learning and prediction modules;
a notification device for indicating to a user of the navigation device the route to a destination of a trip.

2. The navigation device according to claim 1, the navigation device further comprising:
an interface for receiving external data, the external data being selected from a group consisting of:
weather data,
traffic data,
traffic jam data,
diversion routes,
data of restaurants, public buildings or shops lying within a specified distance from the current position of the navigation device,
data of hostels, hotels or leisure facilities lying within a specified distance from the current position of the navigation device,
data of gas stations or car repair shops lying within a specified distance from the current position of the navigation device,
trip sharing requests of participants of a trip sharing service lying within a specified distance from the current position of the navigation device, and
the destination and user profile data of participants of a trip sharing service having been determined by said trip sharing service as potential trip accompanies,
wherein the received external data is used as one or multiple additional starting parameters by the destination prediction algorithm.

3. The navigation device according to claim 2, wherein the interface is to receive external data from a trip sharing service, and wherein the navigation device is further operable to send a predicted destination to the trip sharing service via said interface, thereby notifying other users of the existence of a trip to the predicted destination.

4. The navigation device according to claim 1, the navigation device further comprising:
an interface for receiving vehicle data, the vehicle data being selected from the group consisting of
the number of occupied seats in the vehicle,
the position of the occupied seats in the vehicle,
the filling level of the gas tank,
the vehicles oil level,
error messages generated by any of the vehicle's components, and
status messages generated by any of the vehicle's components,
wherein the received vehicle data is used as one or multiple additional starting parameter by the destination prediction algorithm.

5. The navigation device according to claim 1, the navigation device further comprising an interface for receiving application data, the application data being provided by a software application running on the navigation device, the application data being selected from the group consisting of
calendar event data being received from a calendar application,
data on goods to be sold or bought being received from CRM systems, and
project specific data being received from project management software programs,
wherein the received application data is used as one or multiple additional starting parameters by the destination prediction algorithm.

6. The navigation device according to claim 1, wherein the destination prediction algorithm is implemented as a neural network, wherein the starting parameters and destinations of all trip data objects of the trip history are input data for training the neural network, wherein the neural network as a result of training predicts the destination of a trip by selecting one particular destination from a set of known destinations, the set of known destinations being selected from the group consisting of
destinations having been explicitly entered by the user of the navigation device into the navigation device,
destinations the user of the navigation device chose without entering this data explicitly into the navigation device, implicit destinations, wherein implicit destinations are locations the navigation device has determined automatically during a trip along a route, and application derived destinations, an application derived destination being an address derived from an application installed on the navigation device.

7. The navigation device according to claim 1, wherein each type of starting parameter is assigned a weight, wherein for each starting parameter value or value range of a set of current starting parameters and for each known destination a probability value is calculated, the probability value being indicative of the probability that the known destination is the actual destination given said starting parameter value or value range, and wherein an overall probability is calculated for all known destinations by weighting each probability value calculated for a parameter according to the weight assigned to the type of said parameter, and by summing up the weighted probabilities for each known destination.

8. The navigation device according to claim 2, wherein the predicted destination is submitted via the interface for receiving external data to a remote service provider via the interface, wherein the navigation device receives a response from the remote service provider, the content of the response being dependent on the submitted destination, and wherein the notification device further indicates the received response.

9. The navigation device according to claim 1, wherein the notification device does not indicate navigation instructions in case the destination prediction score of the destination prediction algorithm is above a first prediction score threshold.

10. A navigation device for predicting a destination of a trip, the navigation device comprising:
a position determination unit for determining the current position of the navigation device;
a clock unit for determining the current time and date;
a computer-readable non-transitory data storage for storing a trip history, the trip history comprising a set of trip data objects, each trip data object representing a past trip and comprising starting parameters and an actual destination of the represented trip, the actual destination being the destination chosen and reached by a user of the navigation device, the starting parameters comprising at least:
a starting time and date of the trip, and
a starting point of the trip;
a learning module for generating a destination prediction algorithm, the destination prediction algorithm being generated by using information of the trip history;
a destination prediction module for predicting the destination of the trip, thereby using the destination prediction algorithm, the destination prediction algorithm being operable to predict the destination of the trip by using the starting parameters of the trip;
a processor for executing read/write operations on the data storage and for executing instructions of the learning and prediction modules;
a notification device for indicating to a user of the navigation device the route to a destination of a trip;
wherein the destination prediction algorithm is implemented as a neural network, wherein the starting parameters and destinations of all trip data objects of the trip history are input data for training the neural network, wherein the neural network as a result of training predicts the destination of a trip by selecting one particular destination from a set of known destinations, the set of known destinations being selected from the group consisting of destinations having been explicitly entered by the user of the navigation device into the navigation device, destinations the user of the navigation device chose without entering this data explicitly into the navigation device, implicit destinations, wherein implicit destinations are locations the navigation device has determined automatically during a trip along a route, and application derived destinations, an application derived destination being an address derived from an application installed on the navigation device;

wherein the neural network is implemented as a "feed-forward back-propagation network," wherein weights are assigned to each starting parameter in dependence on its type and wherein the weights of the starting parameters are adapted in each layer of the network by the back-propagation algorithm to minimize a mean squared error value, the mean squared error value being indicative of the prediction accuracy of the destination prediction algorithm.

11. A computer implemented method for predicting the destination of a trip, the method being executed by a navigation device, the method comprising the steps of:
determining, by the position determination unit, the current position of the navigation device as the starting point of the trip, the starting point to be used as a starting parameter;
determining, by the clock unit, the current time and date as the starting time and date of the trip, the starting time and date to be used as starting parameters;
executing a destination prediction algorithm, the destination prediction algorithm taking the starting parameters as input and predicting at least one destination, each predicted destination having assigned a prediction score, the prediction score being derived from the accuracy of the destination prediction algorithm and the probability value of the predicted destination, wherein the destination prediction algorithm is generated by using information of a trip history, the trip history comprising a set of trip data objects, each trip data object in the trip history representing a past trip, each trip data object comprising at least the starting parameters and the actual destination of the past trip, the actual destination being the destination chosen and reached by a user of the navigation device during the past trip represented by said trip data object;
switching, by the navigation device, the mode of operation in dependence on the prediction score value of the predicted destination having assigned the highest prediction score value;
determining an actual destination of the trip; and
storing the actual destination in association with all determined starting parameters in the form of a trip data object in the trip history.

12. The computer implemented method according to claim 11, wherein a repeat is specified, wherein the repeat is executed at least twice, and wherein the actual destination of the trip in the first repeat acts as starting point used in the prediction of the step of executing the destination prediction algorithm of the second repeat, and wherein in step of determining the current time and date as the starting time and date of the trip of the second repeat at least the current time and date is determined as additional starting parameter for the prediction of the destination in the second repeat.

13. The computer implemented method according to claim 11, wherein the destination prediction algorithm is implemented as a neural network, wherein each starting parameter comprises a weight, wherein the weighted starting parameters of all trip data objects of the trip history are used as input for training the neural network, wherein the neural network, as a result of training, predicts the destination of a trip by selecting one particular destination from a set of known destinations, the set of known destinations being selected from the group consisting of the set of all destinations stored in the trip history, comprising destinations explicitly entered into the navigation system by the user and destinations chosen by the user without explicitly entering them into the navigation device, and the set of all destinations having been explicitly entered by the user of the navigation device into the navigation device.

14. The computer implemented method according to claim 11, wherein each starting parameter comprises a weight depending on its type, wherein for each type of starting parameter and for each known destination a probability value is calculated, the probability value indicating the probability value that the known destination will be the actual destination given a set of starting parameters, wherein each parameter type is weighted, and wherein an overall probability is calculated for all known destinations by summing up the weighted probabilities for each known destination given the current starting parameters values, wherein the set of known destinations is selected from the group consisting of destinations having been explicitly entered by the user of the navigation device into the navigation device, destinations the user of the navigation device chose without entering this data explicitly into the navigation system, implicit destinations, wherein implicit destinations are locations the navigation device has determined automatically during a trip along a route, and application derived destinations, an application derived destination being an address derived from an application installed on the navigation device.

15. The computer implemented method according to claim 11, further comprising the step of sending, via an interface for receiving external data, the predicted destination to a trip sharing service, thereby notifying other users of the trip sharing service of the existence of a trip to the predicted destination.

16. The computer implemented method according to claim 11, wherein the mode of operation of the navigation device depends on the accuracy of the destination prediction algorithm.

17. A computer implemented method for predicting the destination of a trip, the method being executed by a navigation device, the method comprising the steps of:

determining, by the position determination unit, the current position of the navigation device as the starting point of the trip, the starting point to be used as a starting parameter;

determining, by the clock unit, the current time and date as the starting time and date of the trip, the starting time and date to be used as starting parameters;

executing a destination prediction algorithm, the destination prediction algorithm taking the starting parameters as input and predicting at least one destination, each predicted destination having assigned a prediction score, the prediction score being derived from the accuracy of the destination prediction algorithm and the probability value of the predicted destination, wherein the destination prediction algorithm is generated by using information of a trip history, the trip history comprising a set of trip data objects, each trip data object in the trip history representing a past trip, each trip data object comprising at least the starting parameters and the actual destination of the past trip, the actual destination being the destination chosen and reached by a user of the navigation device during the past trip represented by said trip data object;

determining an actual destination of the trip; and storing the actual destination in association with all determined starting parameters in the form of a trip data object in the trip history;

wherein the destination prediction algorithm is implemented as a neural network, wherein each starting parameter comprises a weight, wherein the weighted starting parameters of all trip data objects of the trip history are used as input for training the neural network, wherein the neural network, as a result of training, predicts the destination of a trip by selecting one particular destination from a set of known destinations, the set of known destinations being selected from the group consisting of the set of all destinations stored in the trip history, comprising destinations explicitly entered into the navigation system by the user and destinations chosen by the user without explicitly entering them into the navigation device, and the set of all destinations having been explicitly entered by the user of the navigation device into the navigation device;

wherein the neural network is implemented as a "feed-forward back-propagation network," and wherein the weights of the starting parameters are adapted in each layer of the network by the back-propagation algorithm to minimize a mean squared error value, the mean squared error value being indicative of the prediction accuracy of the destination prediction algorithm.

18. A data processing system comprising a server and at least a first navigation device, the server hosting a trip sharing service, the first navigation device including a position determination unit for determining the current position of the navigation device;

a clock unit for determining the current time and date;

a computer-readable non-transitory data storage for storing a trip history, the trip history comprising a set of trip data objects, each trip data object representing a past trip and comprising starting parameters and an actual destination of the represented trip, the actual destination being the destination chosen and reached by a user of the navigation device, the starting parameters comprising at least:

a starting time and date of the trip, and a starting point of the trip;

a learning module for generating a destination prediction algorithm, the destination prediction algorithm being generated by using information of the trip history;

a destination prediction module for predicting the destination of the trip, thereby using the destination prediction algorithm, the destination prediction algorithm being operable to predict the destination of the trip by using the starting parameters of the trip;

a processor for executing read/write operations on the data storage and for executing instructions of the learning and prediction modules; and a notification device for indicating to a user of the navigation device the route to a destination of a trip, the server including:

a processor for executing computer-interpretable instructions;

a network interface for connecting the server to a network;

a web service interface for providing remote access to the program logic of the trip sharing service to the at least one navigation device;

a computer-readable non-transitory storage medium comprising instructions which, when executed by the processor, result in the execution of the trip sharing service, the trip sharing service in operation allocating users with similar user profiles and trip plans as trip accompanies;

wherein the exchanged data is selected from the group consisting of a request being submitted from the navigation device to the trip sharing service, the request indicating other participants of the trip sharing service, the starting time, starting place and destination of a trip, the destination of the trip being predicted by the destination prediction algorithm, and a result being returned by the trip sharing service to the navigation device, the result comprising at least contact information of a second user having been assigned to the user of the navigation device by the trip sharing service as trip accompany.

19. The data processing system according to claim 18, wherein planned trips of each user are represented on the server as server-side trip data objects, wherein each server-side trip data object is implemented as a multi dimensional vector, wherein for each newly created server-side trip data object a matching method is executed, wherein the matching method comprises the comparison of a first server-side trip data object with all server-side trip data objects contained in a database of the trip sharing service, thereby determining a matching score for each pair of compared server-side trip data objects, and wherein two users corresponding to the pair of server-side trip data objects reaching the highest matching score are allocated as trip accompanies.

\* \* \* \* \*